(12) United States Patent
Beaudoin et al.

(10) Patent No.: US 7,096,301 B2
(45) Date of Patent: Aug. 22, 2006

(54) COMMUNICATIONS INTERFACE FOR ENABLING EXTENSION OF AN INTERNAL COMMON BUS ARCHITECTURE (CBA)

(75) Inventors: Denis R. Beaudoin, Rowlett, TX (US); Brian Karguth, Van Alstyne, TX (US); James H. Kennedy, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 377 days.

(21) Appl. No.: 10/382,679

(22) Filed: Mar. 6, 2003

(65) Prior Publication Data

US 2004/0139262 A1 Jul. 15, 2004

Related U.S. Application Data

(60) Provisional application No. 60/439,744, filed on Jan. 13, 2003.

(51) Int. Cl.
*G06F 1/00* (2006.01)
(52) U.S. Cl. ............... 710/305; 710/307; 710/315; 710/105
(58) Field of Classification Search ........ 710/300–306, 710/2–4, 8–19, 24–26, 36–38, 31, 312–316, 710/268, 48–51, 105
See application file for complete search history.

(56) References Cited

U.S. PATENT DOCUMENTS

| | | | | | |
|---|---|---|---|---|---|
| 5,561,806 | A | * | 10/1996 | Fitchett et al. | 709/250 |
| 6,073,186 | A | * | 6/2000 | Murray et al. | 710/11 |
| 6,327,637 | B1 | * | 12/2001 | Chang | 710/305 |
| 6,345,321 | B1 | * | 2/2002 | Litaize et al. | 710/23 |
| 6,442,630 | B1 | * | 8/2002 | Takayama et al. | 710/105 |
| 6,624,763 | B1 | * | 9/2003 | Kuo et al. | 341/58 |
| 6,671,748 | B1 | * | 12/2003 | Cole et al. | 710/8 |
| 6,871,253 | B1 | * | 3/2005 | Greeff et al. | 710/316 |
| 2004/0215861 | A1 | * | 10/2004 | Beaudoin et al. | 710/300 |

* cited by examiner

*Primary Examiner*—John R. Cottingham
*Assistant Examiner*—Raymond N Phan
(74) *Attorney, Agent, or Firm*—W. James Brady, III; Frederick J. Telecky, Jr.

(57) ABSTRACT

A serial communications interface is described that enables the extension of an internal Communications Bus Architecture (CBA) bus segment to one or more external devices. The interface accomplishes this function by serializing bus transactions in one device, transferring the serial transaction between devices via one interface port, and de-serializing the transaction in the external device. The general features include low pin count (as few as three signals), simple packet based transfer protocol for memory mapped access, symmetric operation, simple block code formatting, supports both host to peripheral and peer to peer transactions, and support multiple outstanding transactions.

13 Claims, 25 Drawing Sheets

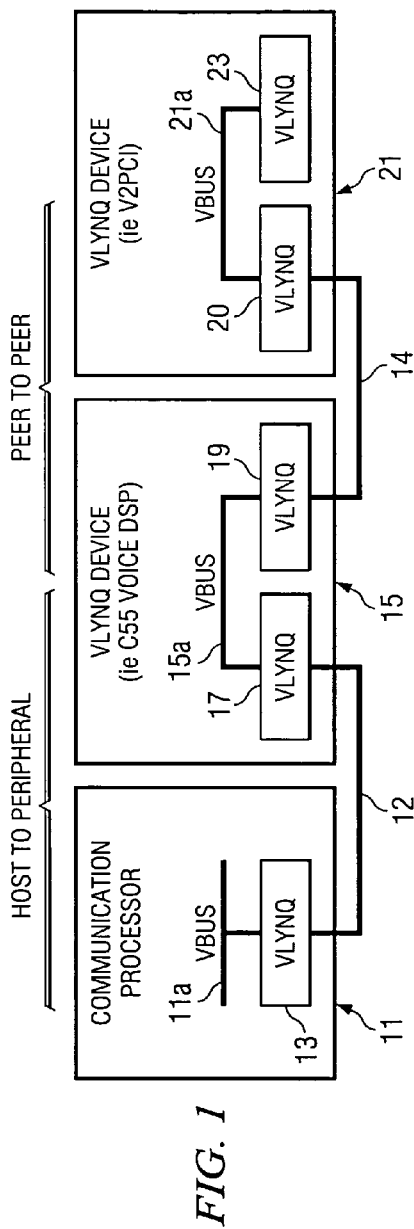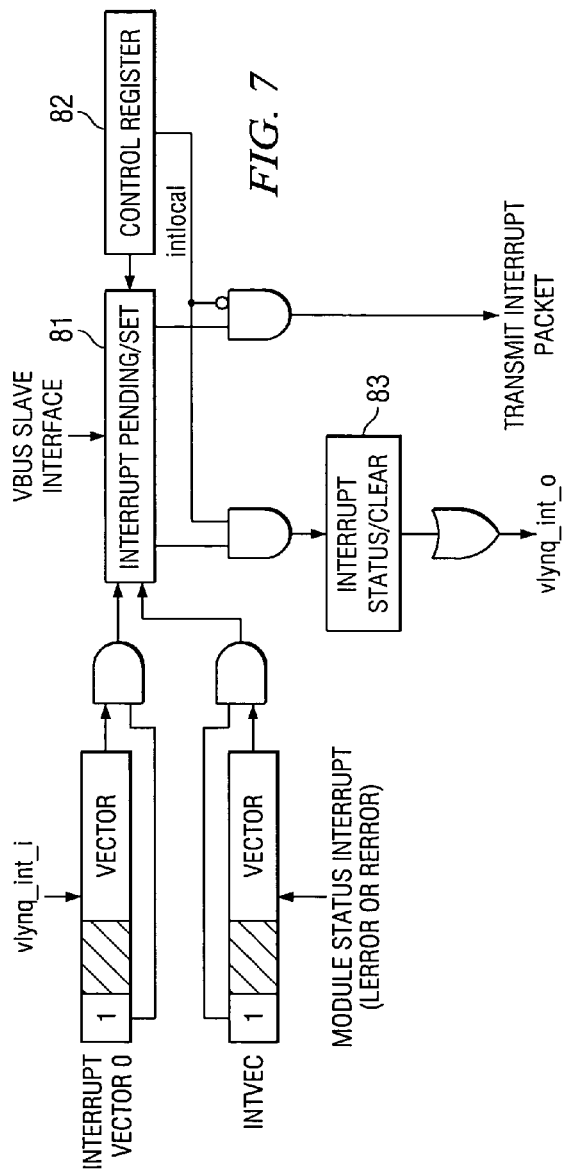

| TIME SLOT | 0 | 1 | 2 | 3 | 4 | 5 | 6 | 7 | 8 | 9 |
|---|---|---|---|---|---|---|---|---|---|---|
| DATA PIN 0 | 1 | 0 | 0 | 0 | 0 | 0 | 0 | 0 | 0 | 0 |
| DATA PIN 1 | 0 | 0 | 0 | 0 | 0 | 0 | 0 | 1 | 0 | 0 |
| DATA PIN 2 | 0 | 0 | 0 | 0 | 0 | 1 | 0 | 0 | 0 | 0 |
| DATA PIN 3 | 0 | 0 | 1 | 0 | 0 | 0 | 0 | 0 | 0 | 0 |

| 31 | | | | 0 |
|---|---|---|---|---|
| REVISION/ID REGISTER | | | | |

| BITS | FIELD | TYPE | RESET | DESCRIPTION |
|---|---|---|---|---|
| 31:16 | ID | R/O | 0x1 | UNIQUE MODULE ID |
| 15:8 | REVMAJ | R/O | 0x2 | MAJOR REVISION |
| 7:0 | REVMIN | R/O | 0x0 | MINOR REVISION |

FIG. 13

| 1 PIN (BIT 0) | 2 PIN (BIT 1, BIT 0) | | 3 PIN (BIT 2, BIT 1, BIT 0) | | | 4 PIN (BIT 3, BIT 2, BIT 1, BIT 0) | | | |
|---|---|---|---|---|---|---|---|---|---|
| 0  | 0  | 0  | 1  | 0  | 0  | 1  | 1  | 0  | 0  |
| 0  | 1  | 1  | 1  | 1  | 1  | 0  | 1  | 1  | 1  |
| 1  | 1  | 1  | X1 | 0  | 1  | 1  | 1  | X2 | X1 |
| 1  | 0  | 1  | 1  | 1  | X2 | 0  | 0  | 0  | 0  |
| 1  | X2 | X1 | 0  | 0  | 0  | X2 | X1 | 1  | 0  |
| 1  | 1  | 1  | 1  | 0  | 0  | 1  | 1  | 0  | 0  |
| 1  | 0  | 0  | 0  | X2 | X1 | 0  | 1  | 1  | 1  |
| 0  | 0  | 0  | 1  | 1  | 0  | 1  | 1  | X2 | X1 |
| X1 | 1  | 0  | 1  | 1  | 1  | 0  | 0  | 0  | 0  |
| X2 | X2 | X1 | X2 | X1 | 0  | X2 | X1 | 1  | 0  |
| 1  | 0  | 0  | 0  | 1  | 1  | 1  | 1  | 0  | 0  |
| 1  | 1  | 1  | 0  | 0  | 0  | 0  | 1  | 1  | 1  |
| 0  | 1  | 1  | X1 | 1  | 0  | 1  | 1  | X2 | X1 |
| 0  | 0  | 1  | 0  | 0  | X2 | 0  | 0  | 0  | 0  |
| 0  | X2 | X1 | 1  | 1  | 1  | X2 | X1 | 1  | 0  |
| 0  | 1  | 1  | 0  | 1  | 1  | 1  | 1  | 0  | 0  |
| 0  | 0  | 0  | 1  | X2 | X1 | 0  | 1  | 1  | 1  |
| 1  | 0  | 0  | 0  | 0  | 1  | 1  | 1  | X2 | X1 |
| X1 | 1  | 0  | 0  | 0  | 0  | 0  | 0  | 0  | 0  |
| X2 | X2 | X1 | X2 | X1 | 1  | X2 | X1 | 1  | 0  |

FIG. 14A

| ADDRESS OFFSET | REGISTER |
|---|---|
| 0x00 | REVISION/ID REGISTER |
| 0x04 | CONTROL REGISTER |
| 0x08 | STATUS REGISTER |
| 0x0c | *RESERVED* |
| 0x10 | INTERRUPT STATUS/CLEAR REGISTER |
| 0x14 | INTERRUPT PENDING/SET REGISTER |
| 0x18 | INTERRUPT POINTER REGISTER |
| 0x1c | Tx ADDRESS MAP |
| 0x20 | Rx ADDRESS MAP SIZE 1 |
| 0x24 | Rx ADDRESS MAP OFFSET 1 |

FROM FIG. 14A

| | |
|---|---|
| 0x28 | Rx ADDRESS MAP SIZE 2 |
| 0x2c | Rx ADDRESS MAP OFFSET 2 |
| 0x30 | Rx ADDRESS MAP SIZE 3 |
| 0x34 | Rx ADDRESS MAP OFFSET 3 |
| 0x38 | Rx ADDRESS MAP SIZE 4 |
| 0x3c | Rx ADDRESS MAP OFFSET 4 |
| 0x40 | CHIP VERSION REGISTER |
| 0x44-0x5c | *RESERVED* |
| 0x60 | INTERRUPT VECTOR 3-0 |
| 0x64 | INTERRUPT VECTOR 7-4 |
| 0x68-0x7c | *RESERVED FOR INTERRUPT VECTORS 8-31* |
| 0x80 | REMOTE REVISION REGISTER |
| 0x84 | REMOTE CONTROL REGISTER |
| 0x88 | REMOTE STATUS REGISTER |
| 0x8c | *RESERVED* |
| 0x90 | REMOTE INTERRUPT STATUS/CLEAR REGISTER |
| 0x94 | REMOTE INTERRUPT PENDING/SET REGISTER |
| 0x98 | REMOTE INTERRUPT POINTER REGISTER |
| 0x9c | REMOTE Tx ADDRESS MAP |
| 0xa0 | REMOTE Rx ADDRESS MAP SIZE 1 |
| 0xa4 | REMOTE Rx ADDRESS MAP OFFSET 1 |
| 0xa8 | REMOTE Rx ADDRESS MAP SIZE 2 |
| 0xac | REMOTE Rx ADDRESS MAP OFFSET 2 |
| 0xb0 | REMOTE Rx ADDRESS MAP SIZE 3 |
| 0xb4 | REMOTE Rx ADDRESS MAP OFFSET 3 |
| 0xb8 | REMOTE Rx ADDRESS MAP SIZE 4 |
| 0xbc | REMOTE Rx ADDRESS MAP OFFSET 4 |
| 0xc0 | REMOTE CHIP VERSION REGISTER |
| 0xc4-0xdc | *RESERVED* |
| 0xe0 | REMOTE INTERRUPT VECTOR 3-0 |
| 0xe4 | REMOTE INTERRUPT VECTOR 7-4 |
| 0xe8-0xfc | *RESERVED FOR REMOTE INTERRUPT VECTORS 8-31* |

FIG. 16A 31                                                                   0

| CONTROL REGISTER ||||
|---|---|---|---|

| BITS | FIELD | TYPE | RESET | DESCRIPTION |
|---|---|---|---|---|
| 31 | pmen | R/W | 0 | POWER MANAGEMENT ENABLED. WHEN SET TO ONE, VLYNQ_CLK, IF SET AS AN OUTPUT, WILL GO INTO IDLE MODE WITH A VALUE OF 1 WHEN THERE IS NO TRAFFIC OVER THE SERIAL BUS. |
| 30:19 | RESERVED | R/O | 0 | ALWAYS READ AS 0. WRITES HAVE NO AFFECT |
| 18:16 | clkdiv | R/W | 0 | SERIAL CLOCK OUTPUT DIVIDER. THIS FIELD DEFINES THE DIVISION FACTOR OF THE VLYNQ_CLK PIN WHEN THIS PIN IS SOURCED FROM THE vlynq_clk_ref (clkdir SET TO ONE). THE OUTPUT CLOCK FREQUENCY WILL BE EQUAL TO vlynq_clk_ref/(1+clkdiv) |
| 15 | clkdir | R/W | 0 | SERIAL CLOCK DIRECTION. THIS BIT DETERMINES WHETHER THE VLYNQ_CLK PIN IS AN INPUT OR AN OUTPUT. WHEN SET TO ZERO, THE VLYNQ_CLK PIN IS SOURCED EXTERNALLY. WHEN SET TO ONE, THE VLYNQ_CLK PIN IS SOURCED FROM A DIVIDED DOWN VERSION OF vbusp_clk |
| 14 | intlocal | R/W | 0 | INTERRUPT LOCAL. THIS BIT DETERMINES WHETHER INTERRUPTS ARE POSTED IN THE INTERRUPT STATUS/CLEAR REGISTER OR FORWARDED VIA THE SERIAL INTERFACE. WHEN SET, INTERRUPTS ARE POSTED IN THE INTERRUPT STATUS/CLEAR REGISTER AND THE vlynq_int_o PIN IS ASSERTED. WHEN CLEAR, INTERRUPTS ARE FORWARDED OUT THE SERIAL INTERFACE TO THE REMOTE DEVICE |
| 13 | intenable | R/W | 0 | INTERRUPT ENABLE. THIS BIT CAUSES VLYNQ MODULE STATUS INTERRUPTS TO BE POSTED TO THE INTERRUPT PENDING/SET REGISTER |
| 12:8 | intvec | R/W | 0 | INTERRUPT VECTOR. THIS FIELD INDICATES WHICH BIT IN THE INTERRUPT PENDING/SET REGISTER IS SET FOR VLYNQ MODULE INTERRUPTS |
| 7 | int2cfg | R/W | 0 | INTERRUPT TO CONFIGURATION REGISTER. WHEN THIS BIT IS SET, THE INTERRUPT PENDING/SET REGISTER IS WRITTEN DIRECTLY WITH THE STATUS CONTAINED IN INTERRUPT PACKETS. WHEN THIS BIT IS SET, THE LEAST SIGNIFICANT 8 BITS OF THE INTERRUPT POINTER REGISTER ARE USED TO POINT TO A LOCAL CONFIGURATION REGISTER (TYPICALLY THE INTERRUPT PENDING/SET REGISTER) |

FROM FIG. 16A

| | | | | |
|---|---|---|---|---|
| 6:2 | RESERVED | R/O | 0 | ALWAYS READ AS 0. WRITES HAVE NO EFFECT |
| 2 | AOPT DISABLE | R/W | 0 | ADDRESS OPTIMIZATION DISABLE. WHEN THIS BIT IS SET, ADDRESS OPTIMIZATION IS DISABLED. WHEN CLEAR, ADDRESS OPTIMIZATION IS ENABLED, ELIMINATING UNNECESSARY ADDRESS BYTES. NO EFFECT FOR VERSION 1.X MODE |
| 1 | ILOOP | R/W | 0 | INTERNAL LOOPBACK. THIS BIT WHEN SET CAUSES THE SERIAL TRANSMIT DATA TO BE WRAPPED BACK TO THE SERIAL RECIEVE DATA. NO EXTERNAL SERIAL CLOCK IS REQUIRED |
| 0 | RESET | R/W | 0 | RESET. WHEN THIS BIT IS SET, ALL INTERNAL STATE MACHINES ARE RESET, THE SERIAL INTERFACE IS DISABLED, LINK IS LOST, AND ALL OUTPUT PINS ARE DISABLED |

INTERRUPT PRIORITY VECTOR STATUS/CLEAR REGISTER

| BITS | FIELD | TYPE | RESET | DESCRIPTION |
|---|---|---|---|---|
| 31 | NOINTPEND | R/O | 1 | INTERRUPT PENDING. A VALUE OF 1 INDICATES THERE ARE NO PENDING INTERRUPTS FROM THE INTERRUPT STATUS/CLEAR REGISTER. A VALUE OF 0 INDICATES THERE IS A PENDING INTERRUPT |
| 30:5 | RESERVED | R/O | 0 | ALWAYS READ AS 0. WRITES HAVE NO EFFECT |
| 4:0 | INTSTAT | R/W | 0 | WHEN READ, THIS FIELD DISPLAYS THE VECTOR THAT IS MAPPED TO THE HIGHEST PRIORITY INTERRUPT BIT THAT IS PENDING FROM THE INTERRUPT STATUS/CLEAR REGISTER, WITH BIT 0 AS THE HIGHEST PRIORITY, AND BIT 31 AS THE LOWEST. WRITING BACK THE VECTOR VALUE INTO THIS FIELD CAN CLEAR THIS INTERRUPT |

| 31 | | | | 0 |
|---|---|---|---|---|
| STATUS REGISTER | | | | |

| BITS | FIELD | TYPE | RESET | DESCRIPTION |
|---|---|---|---|---|
| 31:28 | RESERVED | R/O | 0 | ALWAYS READ AS 0. WRITES HAVE NO EFFECT |
| 27:24 | SWIDTHIN | R/O | X | SIZE OF THE INBOUND SERIAL DATA |
| 23:20 | SWIDTHOUT | R/O | X | SIZE OF THE OUTBOUND SERIAL DATA |
| 19:11 | RESERVED | R/O | 0 | ALWAYS READ AS 0. WRITES HAVE NO EFFECT |
| 10 | IFLOW | R/O | 0 | INBOUND FLOW CONTROL. INDICATES THAT A FLOW CONTROL ENABLE REQUEST HAS BEEN RECEIVED AND HAS STALLED TRANSMIT UNTIL A FLOW CONTROL DISABLE REQUEST IS RECEIVED |
| 9 | OFLOW | R/O | 0 | OUTBOUND FLOW CONTROL. INDICATES THAT THE INTERNAL FLOW CONTROL THRESHOLD HAS BEEN REACHED AND A FLOW CONTROL ENABLE REQUEST HAS BEEN SENT TO THE REMOTE DEVICE |
| 8 | RERROR | W/C | 0 | REMOTE ERROR. THIS BIT INDICATES THAT A DOWNSTREAM VLYNQ MODULE HAS DETECTED A PACKET ERROR. THIS BIT IS SET WHEN A /E/ IS RECEIVED FROM THE SERIAL INTERFACE. THIS BIT IS CLEARED BY WRITING A ONE TO IT |
| 7 | LERROR | W/C | 0 | LOCAL ERROR. THIS BIT INDICATES THAT AN INBOUND PACKET CONTAINS AN ERROR. THIS BIT IS CLEARED BY WRITING A ONE TO IT |
| 6 | NFEMPTY3 | R/O | 0 | FIFO 3 NOT EMPTY. THIS BIT INDICATES THAT THE SLAVE COMMAND IS NOT EMPTY |
| 5 | NFEMPTY2 | R/O | 0 | FIFO 2 NOT EMPTY. THIS BIT INDICATES THAT THE SLAVE DATA FIFO IS NOT EMPTY |
| 4 | NFEMPTY1 | R/O | 0 | FIFO 1 NOT EMPTY. THIS BIT INDICATES THAT THE MASTER COMMAND FIFO IS NOT EMPTY. |
| 3 | NFEMPTY0 | R/O | 0 | FIFO 0 NOT EMPTY. THIS BIT INDICATES THAT THE MASTER DATA FIFO IS NOT EMPTY |
| 2 | SPEND | R/O | 0 | PENDING SLAVE REQUESTS. INDICATES THAT A REQUEST HAS BEEN DETECTED ON THE Tx VBUSP SLAVE INTERFACE |
| 1 | MPEND | R/O | 0 | PENDING MASTER REQUESTS. INDICATES THAT A REQUEST HAS BEEN ASSERTED ON THE Rx VBUSP MASTER INTERFACE |
| 0 | LINK | R/O | 0 | LINK. INDICATES THAT THE SERIAL INTERFACE INITIALIZATION SEQUENCE HAS COMPLETED SUCCESSFULLY |

INTERRUPT STATUS/CLEAR REGISTER
(bits 31:0)

| BITS | FIELD | TYPE | RESET | DESCRIPTION |
|---|---|---|---|---|
| 31:0 | INTCLR | R/W | 0 | THIS FIELD INDICATES THE UNMASKED STATUS OF EACH INTERRUPT. WRITING 1 TO ANY BIT IN THIS FIELD WILL CLEAR THE CORRESPONDING INTERRUPT. WHEN THE INTLOCAL BIT IN THE CONTROL REGISTER IS SET, THE vlynq_int_o PIN IS DRIVEN HIGH WHEN ANY BIT IN THIS REGISTER IS SET |

FIG. 20

INTERRUPT PENDING/SET REGISTER
(bits 31:0)

| BITS | FIELD | TYPE | RESET | DESCRIPTION |
|---|---|---|---|---|
| 31:0 | INTSET | R/W | 0 | THIS FIELD INDICATES THE UNMASKED STATUS OF EACH PENDING INTERRUPT. WRITING 1 TO ANY BIT IN THIS FIELD WILL CAUSE AN INTERRUPT PACKET TO BE SENT ON THE SERIAL INTERFACE IF THE INTLOCAL CONTROL BIT IS NOT SET |

FIG. 21

INTERRUPT POINTER REGISTER
(bits 31:0)

| BITS | FIELD | TYPE | RESET | DESCRIPTION |
|---|---|---|---|---|
| 31:2 | INTPTR | R/W | 0 | INTERRUPT POINTER. THIS REGISTER CONTAINS THE ADDRESS OF THE INTERRUPT SET REGISTER. IT MAY POINT ANY MEMORY MAPPED ADDRESS INCLUDING THE VLYNQ MODULE ITSELF |
| 1:0 | RESERVED | R/O | 0 | ALWAYS READ AS 0. WRITES HAVE NO EFFECT |

FIG. 22

Tx ADDRESS MAP REGISTER
(bits 31:0)

| BITS | FIELD | TYPE | RESET | DESCRIPTION |
|---|---|---|---|---|
| 31:2 | TXADRMAP | R/W | 0 | THIS FIELD IS SUBTRACTED FROM THE VBUSP ADDRESS TO OBTAIN THE ZERO RELATIVE TRANSMIT PACKET ADDRESS |
| 1:0 | RESERVED | R/O | 0 | ALWAYS READ AS 0. WRITES HAVE NO EFFECT |

FIG. 23

| 31 | | | | 0 |
|---|---|---|---|---|
| Rx ADDRESS MAP SIZE 1 REGISTER ||||

| BITS | FIELD | TYPE | RESET | DESCRIPTION |
|---|---|---|---|---|
| 31:2 | RXADRSIZE1 | R/W | 0 | THIS FIELD IS USED TO DETERMINE IF RECEIVE PACKETS ARE DESTINED FOR THE FIRST OF FOUR MAPPED ADDRESS REGIONS. THIS FIELD IS COMPARED WITH THE ADDRESS CONTAINED IN THE RECEIVE PACKET. IF THE RECEIVED PACKET ADDRESS IS LESS THAN THE VALUE IN THIS FIELD, THE PACKET ADDRESS IS ADDED TO THE Rx ADDRESS MAP OFFSET 1 REGISTER TO OBTAIN THE TRANSLATED ADDRESS |
| 1:0 | RESERVED | R/O | 0 | ALWAYS READ AS 0. WRITES HAVE NO EFFECT |

FIG. 24

| 31 | | | | 0 |
|---|---|---|---|---|
| Rx ADDRESS MAP OFFSET 1 REGISTER ||||

| BITS | FIELD | TYPE | RESET | DESCRIPTION |
|---|---|---|---|---|
| 31:2 | RXADROFFSET1 | R/W | 0 | THIS FIELD IS USED WITH THE Rx ADDRESS MAP SIZE 1 REGISTER TO DETERMINE THE TRANSLATED ADDRESS FOR SERIAL DATA. IF THE RECEIVED PACKET ADDRESS IS LESS THAN THE VALUE IN THE Rx ADDRESS MAP SIZE 1 REGISTER, THE PACKET ADDRESS IS ADDED TO THE CONTENTS OF THIS REGISTER TO OBTAIN THE TRANSLATED ADDRESS |
| 1:0 | RESERVED | R/O | 0 | ALWAYS READ AS 0. WRITES HAVE NO EFFECT |

FIG. 25

| 31 | | | | 0 |
|---|---|---|---|---|
| Rx ADDRESS MAP SIZE 2 REGISTER ||||

| BITS | FIELD | TYPE | RESET | DESCRIPTION |
|---|---|---|---|---|
| 31:2 | RXADRSIZE2 | R/W | 0 | THIS FIELD IS USED TO DETERMINE IF RECEIVE PACKETS ARE DESTINED FOR THE SECOND OF FOUR MAPPED ADDRESS REGIONS. THIS FIELD IS COMPARED WITH THE ADDRESS CONTAINED IN THE RECEIVE PACKET. IF THE RECEIVED PACKET ADDRESS IS LESS THAN THE VALUE IN THIS FIELD, THE PACKET ADDRESS IS ADDED TO THE Rx ADDRESS MAP OFFSET 2 REGISTER TO OBTAIN THE TRANSLATED ADDRESS |
| 1:0 | RESERVED | R/O | 0 | ALWAYS READ AS 0. WRITES HAVE NO EFFECT |

FIG. 26

Rx ADDRESS MAP OFFSET 2 REGISTER (bits 31 to 0)

| BITS | FIELD | TYPE | RESET | DESCRIPTION |
|---|---|---|---|---|
| 31:2 | RXADROFFSET2 | R/W | 0 | THIS FIELD IS USED WITH THE Rx ADDRESS MAP SIZE 2 REGISTER TO DETERMINE THE TRANSLATED ADDRESS FOR SERIAL DATA. IF THE RECEIVED PACKET ADDRESS IS LESS THAN THE VALUE IN THE Rx ADDRESS MAP SIZE 2 REGISTER, THE PACKET ADDRESS IS ADDED TO THE CONTENTS OF THIS REGISTER TO OBTAIN THE TRANSLATED ADDRESS |
| 1:0 | RESERVED | R/O | 0 | ALWAYS READ AS 0. WRITES HAVE NO EFFECT |

FIG. 27

Rx ADDRESS MAP SIZE 3 REGISTER (bits 31 to 0)

| BITS | FIELD | TYPE | RESET | DESCRIPTION |
|---|---|---|---|---|
| 31:2 | RXADRSIZE3 | R/W | 0 | THIS FIELD IS USED TO DETERMINE IF RECEIVE PACKETS ARE DESTINED FOR THE THIRD OF FOUR MAPPED ADDRESS REGIONS. THIS FIELD IS COMPARED WITH THE ADDRESS CONTAINED IN THE RECEIVE PACKET. IF THE RECEIVED PACKET ADDRESS IS LESS THAN THE VALUE IN THIS FIELD, THE PACKET ADDRESS IS ADDED TO THE Rx ADDRESS MAP OFFSET 3 REGISTER TO OBTAIN THE TRANSLATED ADDRESS |
| 1:0 | RESERVED | R/O | 0 | ALWAYS READ AS 0. WRITES HAVE NO EFFECT |

FIG. 28

Rx ADDRESS MAP OFFSET 3 REGISTER (bits 31 to 0)

| BITS | FIELD | TYPE | RESET | DESCRIPTION |
|---|---|---|---|---|
| 31:2 | RXADROFFSET3 | R/W | 0 | THIS FIELD IS USED WITH THE Rx ADDRESS MAP SIZE 3 REGISTER TO DETERMINE THE TRANSLATED ADDRESS FOR SERIAL DATA. IF THE RECEIVED PACKET ADDRESS IS LESS THAN THE VALUE IN THE Rx ADDRESS MAP SIZE 3 REGISTER, THE PACKET ADDRESS IS ADDED TO THE CONTENTS OF THIS REGISTER TO OBTAIN THE TRANSLATED ADDRESS |
| 1:0 | RESERVED | R/O | 0 | ALWAYS READ AS 0. WRITES HAVE NO EFFECT |

FIG. 29

Rx ADDRESS MAP SIZE 4 REGISTER (bits 31 to 0)

| BITS | FIELD | TYPE | RESET | DESCRIPTION |
|---|---|---|---|---|
| 31:2 | RXADRSIZE4 | R/W | 0 | THIS FIELD IS USED TO DETERMINE IF RECEIVE PACKETS ARE DESTINED FOR THE FOURTH OF FOUR MAPPED ADDRESS REGIONS. THIS FIELD IS COMPARED WITH THE ADDRESS CONTAINED IN THE RECEIVE PACKET. IF THE RECEIVED PACKET ADDRESS IS LESS THAN THE VALUE IN THIS FIELD, THE PACKET ADDRESS IS ADDED TO THE Rx ADDRESS MAP OFFSET 4 REGISTER TO OBTAIN THE TRANSLATED ADDRESS |
| 1:0 | RESERVED | R/O | 0 | ALWAYS READ AS 0. WRITES HAVE NO EFFECT |

FIG. 30

Rx ADDRESS MAP OFFSET 4 REGISTER (bits 31 to 0)

| BITS | FIELD | TYPE | RESET | DESCRIPTION |
|---|---|---|---|---|
| 31:2 | RXADROFFSET4 | R/W | 0 | THIS FIELD IS USED WITH THE Rx ADDRESS MAP SIZE 4 REGISTER TO DETERMINE THE TRANSLATED ADDRESS FOR SERIAL DATA. IF THE RECEIVED PACKET ADDRESS IS LESS THAN THE VALUE IN THE Rx ADDRESS MAP SIZE 4 REGISTER, THE PACKET ADDRESS IS ADDED TO THE CONTENTS OF THIS REGISTER TO OBTAIN THE TRANSLATED ADDRESS |
| 1:0 | RESERVED | R/O | 0 | ALWAYS READ AS 0. WRITES HAVE NO EFFECT |

FIG. 31

CHIP VERSION REGISTER (bits 31 to 0)

| BITS | FIELD | TYPE | RESET | DESCRIPTION |
|---|---|---|---|---|
| 31:16 | DEVREV | R/O | device_rev | DEVICE REVISION. THIS FIELD REFLECTS THE VALUE OF THE device_rev PINS |
| 15:0 | DEVID | R/O | device_id | DEVICE ID. THIS FIELD REFLECTS THE VALUE OF THE device_id PINS. THE DEVICE MUST BE REGISTERED WITH THE VLYNQ IP GROUP TO BE ASSIGNED AN ID |

FIG. 32

| 31 | | | | 0 |
|---|---|---|---|---|
| AUTO NEGOTIATION | | | | |

| BITS | FIELD | TYPE | RESET | DESCRIPTION |
|---|---|---|---|---|
| 31:17 | RESERVED | R/O | 0x0 | ALWAYS READ AS 0. WRITES HAVE NO EFFECT |
| 16 | 2.X | R/O | 0x1 | VERSION 2.X MODE. A VALUE OF ONE INDICATES THAT VLYNQ WILL COMMUNICATE WITH THE REMOTE VLYNQ USING VERSION 2.X PROTOCOL. A VALUE OF ZERO INDICATES A LINK WAS ESTABLISHED WITH A VERSION 1.X VLYNQ |
| 15:0 | RESERVED | R/O | 0x0 | ALWAYS READ AS 0. WRITES HAVE NO EFFECT |

FIG. 33

| 31 | | | | 0 |
|---|---|---|---|---|
| MANUAL NEGOTIATION | | | | |

| BITS | FIELD | TYPE | RESET | DESCRIPTION |
|---|---|---|---|---|
| 31:0 | RESERVED | R/O | 0x0 | ALWAYS READ AS 0. WRITES HAVE NO EFFECT |

FIG. 34

| 31 | | | | 0 |
|---|---|---|---|---|
| NEGOTIATION STATUS | | | | |

| BITS | FIELD | TYPE | RESET | DESCRIPTION |
|---|---|---|---|---|
| 31:1 | RESERVED | R/O | 0x0 | ALWAYS READ AS 0. WRITES HAVE NO EFFECT |
| 0 | MODE | R/O | 0x1 | MODE MASK. A '1' IN A PARTICULAR BIT POSITION INDICATES THAT THE DEVICE SUPPORTS THE MODE CORRESPONDING WITH THE BIT NUMBER. A MODE-0-ONLY DEVICE WOULD SHOW 00000001b, A MODE-1-ONLY DEVICE WOULD SHOW 00000010b, ETC. THE DEFAULT MODE=0 IS COVERED IN THE PACKET FORMAT SECTION |

FIG. 35

| 31 | | | | 0 |
|---|---|---|---|---|
| ENDIAN REGISTER | | | | |

| BITS | FIELD | TYPE | RESET | DESCRIPTION |
|---|---|---|---|---|
| 31:0 | ENDIAN | R/W | 0x2F2F2F2F | WHEN A VALUE OF 0x2F2F2F2F IS WRITTEN TO THIS REGISTER, THE ENDIANNESS OF THE VLYNQ IS LITTLE ENDIAN. WHEN A VALUE OF 0xF2F2F2F2 IS WRITTEN TO THIS REGISTER, THE ENDIANNESS OF THE VLYNQ IS BIG ENDIAN |

| 31 | | | | 0 |
|---|---|---|---|---|
| INTERRUPT VECTOR 3-0 REGISTER ||||||

| BITS | FIELD | TYPE | RESET | DESCRIPTION |
|---|---|---|---|---|
| 31 | INTEN3 | R/W | 0 | INTERRUPT ENABLE 3. WHEN SET, THIS BIT INDICATES THAT INTERRUPTS DETECTED ON THE vlynq_int_i[3] PIN SHOULD BE WRITTEN TO THE INTERRUPT PENDING/SET REGISTER WHICH WILL SUBSEQUENTLY GENERATE AN INTERRUPT DEPENDING ON THE STATUS OF THE INTLOCAL BIT IN THE CONTROL REGISTER |
| 30 | INTTYPE3 | R/W | 0 | INTERRUPT TYPE 3. WHEN SET, THIS BIT INDICATES THAT THE vlynq_int_i[3] INTERRUPT IS PULSED. WHEN CLEAR, THIS BIT INDICATES THAT vlynq_int_i[3] IS LEVEL SENSITIVE |
| 29 | INTPOL3 | R/W | 0 | INTERRUPT POLARITY 3. WHEN SET, THIS BIT INDICATES THAT THE vlynq_int_i[3] INTERRUPT IS ACTIVE LOW. WHEN CLEAR, THIS BIT INDICATES THAT vlynq_int_i[3] IS ACTIVE HIGH |
| 28:24 | INTVEC3 | R/W | 0 | INTERRUPT VECTOR 3. THIS FIELD MAPS THE vlynq_int_i[3] PIN TO A BIT IN THE INTERRUPT PENDING/SET REGISTER |
| 23 | INTEN2 | R/W | 0 | INTERRUPT ENABLE 2. WHEN SET, THIS BIT INDICATES THAT INTERRUPTS DETECTED ON THE vlynq_int_i[2] PIN SHOULD BE WRITTEN TO THE INTERRUPT PENDING/SET REGISTER WHICH WILL SUBSEQUENTLY GENERATE AN INTERRUPT DEPENDING ON THE STATUS OF THE INTLOCAL BIT IN THE CONTROL REGISTER |
| 22 | INTTYPE2 | R/W | 0 | INTERRUPT TYPE 2. WHEN SET, THIS BIT INDICATES THAT THE vlynq_int_i[2] INTERRUPT IS PULSED. WHEN CLEAR, THIS BIT INDICATES THAT vlynq_int_i[2] IS LEVEL SENSITIVE |
| 21 | INTPOL2 | R/W | 0 | INTERRUPT POLARITY 2. WHEN SET, THIS BIT INDICATES THAT THE vlynq_int_i[2] INTERRUPT IS ACTIVE LOW. WHEN CLEAR, THIS BIT INDICATES THAT vlynq_int_i[2] IS ACTIVE HIGH |
| 20:16 | INTVEC2 | R/W | 0 | INTERRUPT VECTOR 2. THIS FIELD MAPS THE vlynq_int_i[2] PIN TO A BIT IN THE INTERRUPT PENDING/SET REGISTER |

FIG. 36B
FROM FIG. 36A

| | | | | |
|---|---|---|---|---|
| 15 | INTEN1 | R/W | 0 | INTERRUPT ENABLE 1. WHEN SET, THIS BIT INDICATES THAT INTERRUPTS DETECTED ON THE vlynq_int_i[1] PIN SHOULD BE WRITTEN TO THE INTERRUPT PENDING/SET REGISTER WHICH WILL SUBSEQUENTLY GENERATE AN INTERRUPT DEPENDING ON THE STATUS OF THE INTLOCAL BIT IN THE CONTROL REGISTER |
| 14 | INTTYPE1 | R/W | 0 | INTERRUPT TYPE 1. WHEN SET, THIS BIT INDICATES THAT THE vlynq_int_i[1] INTERRUPT IS PULSED. WHEN CLEAR, THIS BIT INDICATES THAT vlynq_int_i[1] IS LEVEL SENSITIVE |
| 13 | INTPOL1 | R/W | 0 | INTERRUPT POLARITY 1. WHEN SET, THIS BIT INDICATES THAT THE vlynq_int_i[1] INTERRUPT IS ACTIVE LOW. WHEN CLEAR, THIS BIT INDICATES THAT vlynq_int_i[1] IS ACTIVE HIGH |
| 12:8 | INTVEC1 | R/W | 0 | INTERRUPT VECTOR 1. THIS FIELD MAPS THE vlynq_int_i[1] PIN TO A BIT IN THE INTERRUPT PENDING/SET REGISTER |
| 7 | INTEN0 | R/W | 0 | INTERRUPT ENABLE 0. WHEN SET, THIS BIT INDICATES THAT INTERRUPTS DETECTED ON THE vlynq_int_i[0] PIN SHOULD BE WRITTEN TO THE INTERRUPT PENDING/SET REGISTER WHICH WILL SUBSEQUENTLY GENERATE AN INTERRUPT DEPENDING ON THE STATUS OF THE INTLOCAL BIT IN THE CONTROL REGISTER |
| 6 | INTTYPE0 | R/W | 0 | INTERRUPT TYPE 0. WHEN SET, THIS BIT INDICATES THAT THE vlynq_int_i[0] INTERRUPT IS PULSED. WHEN CLEAR, THIS BIT INDICATES THAT vlynq_int_i[0] IS LEVEL SENSITIVE |
| 5 | INTPOL0 | R/W | 0 | INTERRUPT POLARITY 0. WHEN SET, THIS BIT INDICATES THAT THE vlynq_int_i[0] INTERRUPT IS ACTIVE LOW. WHEN CLEAR, THIS BIT INDICATES THAT vlynq_int_i[0] IS ACTIVE HIGH |
| 4:0 | INTVEC0 | R/W | 0 | INTERRUPT VECTOR 0. THIS FIELD MAPS THE vlynq_int_i[0] PIN TO A BIT IN THE INTERRUPT PENDING/SET REGISTER |

| 31 | | | | 0 |
|---|---|---|---|---|
| INTERRUPT VECTOR 7-4 REGISTER | | | | |

| BITS | FIELD | TYPE | RESET | DESCRIPTION |
|---|---|---|---|---|
| 31 | INTEN7 | R/W | 0 | INTERRUPT ENABLE 7. WHEN SET, THIS BIT INDICATES THAT INTERRUPTS DETECTED ON THE vlynq_int_i[7] PIN SHOULD BE WRITTEN TO THE INTERRUPT PENDING/SET REGISTER WHICH WILL SUBSEQUENTLY GENERATE AN INTERRUPT DEPENDING ON THE STATUS OF THE INTLOCAL BIT IN THE CONTROL REGISTER |
| 30 | INTTYPE7 | R/W | 0 | INTERRUPT TYPE 7. WHEN SET, THIS BIT INDICATES THAT THE vlynq_int_i[7] INTERRUPT IS PULSED. WHEN CLEAR, THIS BIT INDICATES THAT vlynq_int_i[7] IS LEVEL SENSITIVE |
| 29 | INTPOL7 | R/W | 0 | INTERRUPT POLARITY 7. WHEN SET, THIS BIT INDICATES THAT THE vlynq_int_i[7] INTERRUPT IS ACTIVE LOW. WHEN CLEAR, THIS BIT INDICATES THAT vlynq_int_i[7] IS ACTIVE HIGH |
| 28:24 | INTVEC7 | R/W | 0 | INTERRUPT VECTOR 7. THIS FIELD MAPS THE vlynq_int_i[7] PIN TO A BIT IN THE INTERRUPT PENDING/SET REGISTER |
| 23 | INTEN6 | R/W | 0 | INTERRUPT ENABLE 6. WHEN SET, THIS BIT INDICATES THAT INTERRUPTS DETECTED ON THE vlynq_int_i[6] PIN SHOULD BE WRITTEN TO THE INTERRUPT PENDING/SET REGISTER WHICH WILL SUBSEQUENTLY GENERATE AN INTERRUPT DEPENDING ON THE STATUS OF THE INTLOCAL BIT IN THE CONTROL REGISTER |
| 22 | INTTYPE6 | R/W | 0 | INTERRUPT TYPE 6. WHEN SET, THIS BIT INDICATES THAT THE vlynq_int_i[6] INTERRUPT IS PULSED. WHEN CLEAR, THIS BIT INDICATES THAT vlynq_int_i[6] IS LEVEL SENSITIVE |
| 21 | INTPOL6 | R/W | 0 | INTERRUPT POLARITY 6. WHEN SET, THIS BIT INDICATES THAT THE vlynq_int_i[6] INTERRUPT IS ACTIVE LOW. WHEN CLEAR, THIS BIT INDICATES THAT vlynq_int_i[6] IS ACTIVE HIGH |
| 20:16 | INTVEC6 | R/W | 0 | INTERRUPT VECTOR 6. THIS FIELD MAPS THE vlynq_int_i[6] PIN TO A BIT IN THE INTERRUPT PENDING/SET REGISTER |

FIG. 37B
FROM FIG. 37A

| | | | | |
|---|---|---|---|---|
| 15 | INTEN5 | R/W | 0 | INTERRUPT ENABLE 5. WHEN SET, THIS BIT INDICATES THAT INTERRUPTS DETECTED ON THE vlynq_int_i[5] PIN SHOULD BE WRITTEN TO THE INTERRUPT PENDING/SET REGISTER WHICH WILL SUBSEQUENTLY GENERATE AN INTERRUPT DEPENDING ON THE STATUS OF THE INTLOCAL BIT IN THE CONTROL REGISTER |
| 14 | INTTYPE5 | R/W | 0 | INTERRUPT TYPE 5. WHEN SET, THIS BIT INDICATES THAT THE vlynq_int_i[5] INTERRUPT IS PULSED. WHEN CLEAR, THIS BIT INDICATES THAT vlynq_int_i[5] IS LEVEL SENSITIVE |
| 13 | INTPOL5 | R/W | 0 | INTERRUPT POLARITY 5. WHEN SET, THIS BIT INDICATES THAT THE vlynq_int_i[5] INTERRUPT IS ACTIVE LOW. WHEN CLEAR, THIS BIT INDICATES THAT vlynq_int_i[5] IS ACTIVE HIGH |
| 12:8 | INTVEC5 | R/W | 0 | INTERRUPT VECTOR 5. THIS FIELD MAPS THE vlynq_int_i[5] PIN TO A BIT IN THE INTERRUPT PENDING/SET REGISTER |
| 7 | INTEN4 | R/W | 0 | INTERRUPT ENABLE 4. WHEN SET, THIS BIT INDICATES THAT INTERRUPTS DETECTED ON THE vlynq_int_i[4] PIN SHOULD BE WRITTEN TO THE INTERRUPT PENDING/SET REGISTER WHICH WILL SUBSEQUENTLY GENERATE AN INTERRUPT DEPENDING ON THE STATUS OF THE INTLOCAL BIT IN THE CONTROL REGISTER |
| 6 | INTTYPE4 | R/W | 0 | INTERRUPT TYPE 4. WHEN SET, THIS BIT INDICATES THAT THE vlynq_int_i[4] INTERRUPT IS PULSED. WHEN CLEAR, THIS BIT INDICATES THAT vlynq_int_i[4] IS LEVEL SENSITIVE |
| 5 | INTPOL4 | R/W | 0 | INTERRUPT POLARITY 4. WHEN SET, THIS BIT INDICATES THAT THE vlynq_int_i[4] INTERRUPT IS ACTIVE LOW. WHEN CLEAR, THIS BIT INDICATES THAT vlynq_int_i[4] IS ACTIVE HIGH |
| 4:0 | INTVEC4 | R/W | 0 | INTERRUPT VECTOR 4. THIS FIELD MAPS THE vlynq_int_i[4] PIN TO A BIT IN THE INTERRUPT PENDING/SET REGISTER |

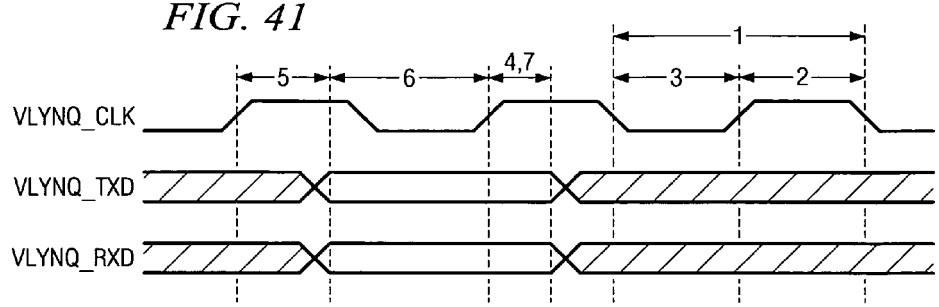

FIG. 41

FIG. 42B
FROM FIG. 42A

| ADDRESS[23:16] | ADDRESS BYTE 2. THIS BYTE IS INCLUDED ONLY IF ADRMASK[2] IS SET TO ONE. IF ADRMASK[2] IS SET TO ZERO, THIS BYTE SHOULD BE ASSUMED TO BE EQUAL TO BITS 23:16 OF THE PREVIOUS ADDRESS. READ RESPONSE PACKETS DO NOT INCLUDE THIS FIELD |
|---|---|
| ADDRESS[31:24] | ADDRESS BYTE 3. THIS BYTE IS INCLUDED ONLY IF ADRMASK[3] IS SET TO ONE. IF ADRMASK[3] IS SET TO ZERO, THIS BYTE SHOULD BE ASSUMED TO BE EQUAL TO BITS 31:24 OF THE PREVIOUS ADDRESS. READ RESPONSE PACKETS DO NOT INCLUDE THIS FIELD |
| DATA | DATA PAYLOAD. THE MAXIMUM DATA PAYLOAD SIZE IS LIMITED TO 16 32-BIT WORDS TO ALLOW IT TO FIT IN THE Rx FIFO |
| EOP | END OF PACKET INDICATOR, /T/ |

FIG. 43B
FROM FIG. 43A

| ADDRESS[23:16] | ADDRESS BYTE 2. THIS BYTE IS INCLUDED ONLY IF ADRMASK[2] IS SET TO ONE. IF ADRMASK[2] IS SET TO ZERO, THIS BYTE SHOULD BE ASSUMED TO BE EQUAL TO BITS 23:16 OF THE PREVIOUS ADDRESS. READ RESPONSE PACKETS DO NOT INCLUDE THIS FIELD |
|---|---|
| ADDRESS[31:24] | ADDRESS BYTE 3. THIS BYTE IS INCLUDED ONLY IF ADRMASK[3] IS SET TO ONE. IF ADRMASK[3] IS SET TO ZERO, THIS BYTE SHOULD BE ASSUMED TO BE EQUAL TO BITS 31:24 OF THE PREVIOUS ADDRESS. READ RESPONSE PACKETS DO NOT INCLUDE THIS FIELD |
| DATA | DATA PAYLOAD. THE MAXIMUM DATA PAYLOAD SIZE IS LIMITED TO 16 32-BIT WORDS TO ALLOW IT TO FIT IN THE Rx FIFO |
| EOP | END OF PACKET INDICATOR, /T/ |

FIG. 42A

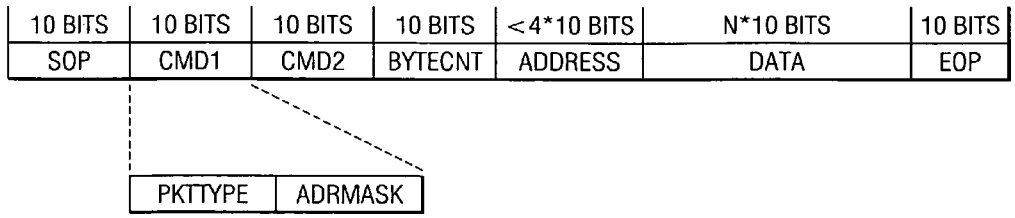

| 10 BITS | 10 BITS | 10 BITS | 10 BITS | <4*10 BITS | N*10 BITS | 10 BITS |
|---------|---------|---------|---------|------------|-----------|---------|
| SOP | CMD1 | CMD2 | BYTECNT | ADDRESS | DATA | EOP |

| | PKTTYPE | ADRMASK |
|---|---------|---------|

| FIELD | DESCRIPTION | |
|-------|-------------|---|
| SOP | START OF PACKET INDICATOR, /S/. | |
| PKTTYPE[3:0] | THIS FIELD INDICATES THE PACKET TYPE.<br><br>0000 - WRITE<br>0001 - WRITE WITH ADDRESS INCREMENT<br>0010 - RESERVED<br>0011 - WRITE 32-BIT WORD WITH ADDRESS INCREMENT<br>0100 - CONFIGURATION WRITE<br>0101 - CONFIGURATION WRITE WITH ADDRESS INCREMENT<br>0110 - RESERVED FOR EXTENDED COMMAND INDICATOR (CMD2)<br>0111 - INTERRUPT<br>1000 - READ<br>1001 - READ WITH ADDRESS INCREMENT<br>1010 - RESERVED<br>1011 - READ 32-BIT WORD WITH ADDRESS INCREMENT<br>1100 - CONFIGURATION READ<br>1101 - CONFIGURATION READ WITH ADDRESS INCREMENT<br>1110 - READ RESPONSE<br>1111 - CONFIGURATION READ RESPONSE | MODE=0<br><br><br>✓<br><br>✓<br><br>✓<br>✓<br><br>✓<br><br>✓<br><br>✓<br><br>✓<br>✓ |
| ADRMASK[3:0] | INDICATES WHICH BYTE OF ADDRESS HAS BEEN INCLUDED IN THE PACKET. ONLY ADDRESS BYTES THAT HAVE CHANGED SINCE THE PREVIOUS ADDRESS WILL BE INCLUDED. EACH BIT CORRESPONDS TO ONE BYTE OF ADDRESS | |
| BYTECNT[7:0] | BYTE COUNT. THIS FIELD INDICATES THE TOTAL NUMBER OF BYTES IN THE PACKET. THIS FIELD IS ONLY INCLUDED FOR WRITE, READ, AND CONFIGURATION PACKET TYPES. ALL OTHER PACKET TYPES HAVE FIXED LENGTHS AND DO NOT REQUIRE THIS FIELD | |
| ADDRESS[7:0] | ADDRESS BYTE 0. THIS BYTE IS INCLUDED ONLY IF ADRMASK[0] IS SET TO ONE. IF ADRMASK[0] IS SET TO ZERO, THIS BYTE SHOULD BE ASSUMED TO BE EQUAL TO BITS 7:0 OF THE PREVIOUS ADDRESS. READ RESPONSE PACKETS DO NOT INCLUDE THIS FIELD | |
| ADDRESS[15:8] | ADDRESS BYTE 1. THIS BYTE IS INCLUDED ONLY IF ADRMASK[1] TO SET TO ONE. IF ADRMASK[1] IS SET TO ZERO, THIS BYTE SHOULD BE ASSUMED TO BE EQUAL TO BITS 15:8 OF THE PREVIOUS ADDRESS. READ RESPONSE PACKETS DO NOT INCLUDE THIS FIELD | |

| 10 BITS | 10 BITS | 10 BITS | <4*10 BITS | N*10 BITS | 10 BITS |
|---------|---------|---------|------------|-----------|---------|
| CMD1    | CMD2    | BYTECNT | ADDRESS    | DATA      | EOP     |

| PKTTYPE | ADRMASK |
|---------|---------|

| FIELD | DESCRIPTION | |
|-------|-------------|---|
| PKTTYPE[3:0] | THIS FIELD INDICATES THE PACKET TYPE.<br><br>0000 - RESERVED<br>0001 - WRITE WITH ADDRESS INCREMENT<br>0010 - RESERVED<br>0011 - WRITE 32-BIT WORD WITH ADDRESS INCREMENT<br>0100 - RESERVED<br>0101 - CONFIGURATION WRITE WITH ADDRESS INCREMENT<br>0110 - RESERVED<br>0111 - INTERRUPT<br>1000 - RESERVED<br>1001 - READ WITH ADDRESS INCREMENT<br>1010 - RESERVED<br>1011 - READ 32-BIT WORD WITH ADDRESS INCREMENT<br>1100 - RESERVED<br>1101 - CONFIGURATION READ WITH ADDRESS INCREMENT<br>1110 - READ RESPONSE FOR VLYNQ 1.x<br>       RESERVED FOR VLYNQ VERSION 2.0 AND LATER<br>1111 - READ RESPONSE FOR ALL VLYNQ VERSIONS | MODE=0<br><br><br>✓<br><br>✓<br><br>✓<br><br>✓<br><br>✓<br><br>✓<br><br>✓<br>✓<br><br>✓ |
| ADRMASK[3:0] | INDICATES WHICH BYTE OF ADDRESS HAS BEEN INCLUDED IN THE PACKET. ONLY ADDRESS BYTES THAT HAVE CHANGED SINCE THE PREVIOUS ADDRESS WILL BE INCLUDED. EACH BIT CORRESPONDS TO ONE BYTE OF ADDRESS | |
| BYTECNT[7:0] | BYTE COUNT. THIS FIELD INDICATES THE TOTAL NUMBER OF BYTES IN THE PACKET. THIS FIELD IS ONLY INCLUDED FOR WRITE, READ, AND CONFIGURATION PACKET TYPES. ALL OTHER PACKET TYPES HAVE FIXED LENGTHS AND DO NOT REQUIRE THIS FIELD | |
| ADDRESS[7:0] | ADDRESS BYTE 0. THIS BYTE IS INCLUDED ONLY IF ADRMASK[0] IS SET TO ONE. IF ADRMASK[0] IS SET TO ZERO, THIS BYTE SHOULD BE ASSUMED TO BE EQUAL TO BITS 7:0 OF THE PREVIOUS ADDRESS. READ RESPONSE PACKETS DO NOT INCLUDE THIS FIELD | |
| ADDRESS[15:8] | ADDRESS BYTE 1. THIS BYTE IS INCLUDED ONLY IF ADRMASK[1] IS TO SET TO ONE. IF ADRMASK[1] IS SET TO ZERO, THIS BYTE SHOULD BE ASSUMED TO BE EQUAL TO BITS 15:8 OF THE PREVIOUS ADDRESS. READ RESPONSE PACKETS DO NOT INCLUDE THIS FIELD | |

TO FIG. 43B

COMMUNICATIONS INTERFACE FOR ENABLING EXTENSION OF AN INTERNAL COMMON BUS ARCHITECTURE (CBA)

This application claims priority under 35 USC § 119(e)(1) of provisional application Ser. No. 60/439,744 filed Jan. 13, 2003.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This invention relates to a communications interface and more particularly to a communications interface that enables the extension of an internal common bus architecture (CBA) bus segment to one or more physical devices.

BACKGROUND OF INVENTION

The communication to and from both home and office is undergoing a change to provide both cable and DSL broadband access. It is highly desirable to provide a common computer/software/peripheral platform architecture across cable, DSL, IEEE 802.11, IP phone and voice gateways. A communications processor architecture includes a 32-bit MIP processor, a switched bus architecture, a distributed DMA architecture, optimized memory interface, programmable memory management and write back or write through cache write policy. The software platform for the services includes device drivers (USB, PCI, Ethernet, HDLC, Timers, 802.11 etc.), RTOS support (VxWorks, Linux, Nucleus etc.), networking software (ATM, TCP/IP, bridging, routing, filtering etc.), network management (SNMP, web servers/stacks), PC drivers, and robust APIs with clearly defined software layers for customers to add value. A communications chip for all of these markets becomes costly. Texas Instruments Inc. built a product that has two DSPs for voice, all interfaces, a mixed signal processor, RAM, and a lot of peripherals, a MAC, a complete segmentation re-assembly for ATM, HM interface, a broadband interface, memory interface and a VGA. The result is a product that has 256 pins and the chip becomes costly. This is also not very expandable because any time one tries to hook a wireless on that one has to put it on the memory bus and that means it burns up memory bandwidth which is critical to the operation speed of the CPU. This also means that going to the peripheral the operation is in the asynchronous cycle which is slow as compared to DRAM. A 16-bit bus could be added with 32 pins but that is costly and would not have much memory range. Many developers for products in these areas do not want to pay for such a costly chip and don't need all the functions. We have had to bond out abilities on the chip but the buyer has to pay for abilities not used. It is highly desirable to provide platforms for market segments wherein the main function is functionally integrated and an expansion capability is provided via a low cost, software compatible communications link.

SUMMARY OF INVENTION

In accordance with one embodiment of the present invention a serial communications interface is provided that enables the extension of an internal Communications Bus Architecture (CBA) bus segment to one or more external physical devices. The interface accomplishes this function by serializing bus transactions in one device, transferring the serialized transaction between devices via an interface port, and de-serializing the transaction in the external device.

DESCRIPTION OF DRAWINGS

FIG. 1 is a block diagram of a host to peer and peer to peer serial interface connection according to one embodiment of the present invention.

FIG. 7 illustrates interrupt detection and generation.

FIG. 13 illustrates parallel width negotiation.

FIG. 14 is a register map.

FIG. 16 illustrates the control register.

FIG. 17 illustrates the status register.

FIG. 18 illustrates Interrupt Priority Vector Status/Clear register.

FIG. 19 illustrates the Interrupt Status/Clear register.

FIG. 20 illustrates the Interrupt Pending/Set register.

FIG. 21 illustrates the Interrupt Pointer register.

FIG. 22 illustrates the Tx Address Map register.

FIG. 23 illustrates Rx Address Map Size 1 register.

FIG. 24 illustrates the Rx Address Map Offset 1 register.

FIG. 25 illustrates the Rx Address Mao Size 2 register.

FIG. 26 illustrates the Rx Address Map Offset 2 register.

FIG. 27 illustrates the Rx Address Map Size 3 register.

FIG. 28 illustrates the Rx Address Map Offset 3 register.

FIG. 29 illustrates the Rx Address Map Size 4 register.

FIG. 30 illustrates the Rx Address Map Offset 4 register.

FIG. 31 illustrates the Chip Version register.

FIG. 32 illustrates the Auto Negotiation.

FIG. 33 illustrates the manual Negotiation.

FIG. 34 illustrates the Negotiation Status.

FIG. 35 illustrates the Endian.

FIG. 36 illustrates the Interrupt Vector 3-0 register.

FIG. 37 illustrates the Interrupt Vector 7-4 register.

FIG. 41 illustrates the timing diagram.

FIG. 42 illustrates the 1.X packet format.

FIG. 43 illustrates the 2.0 packet format

DESCRIPTION OF PREFERRED EMBODIMENTS

Figure 2:
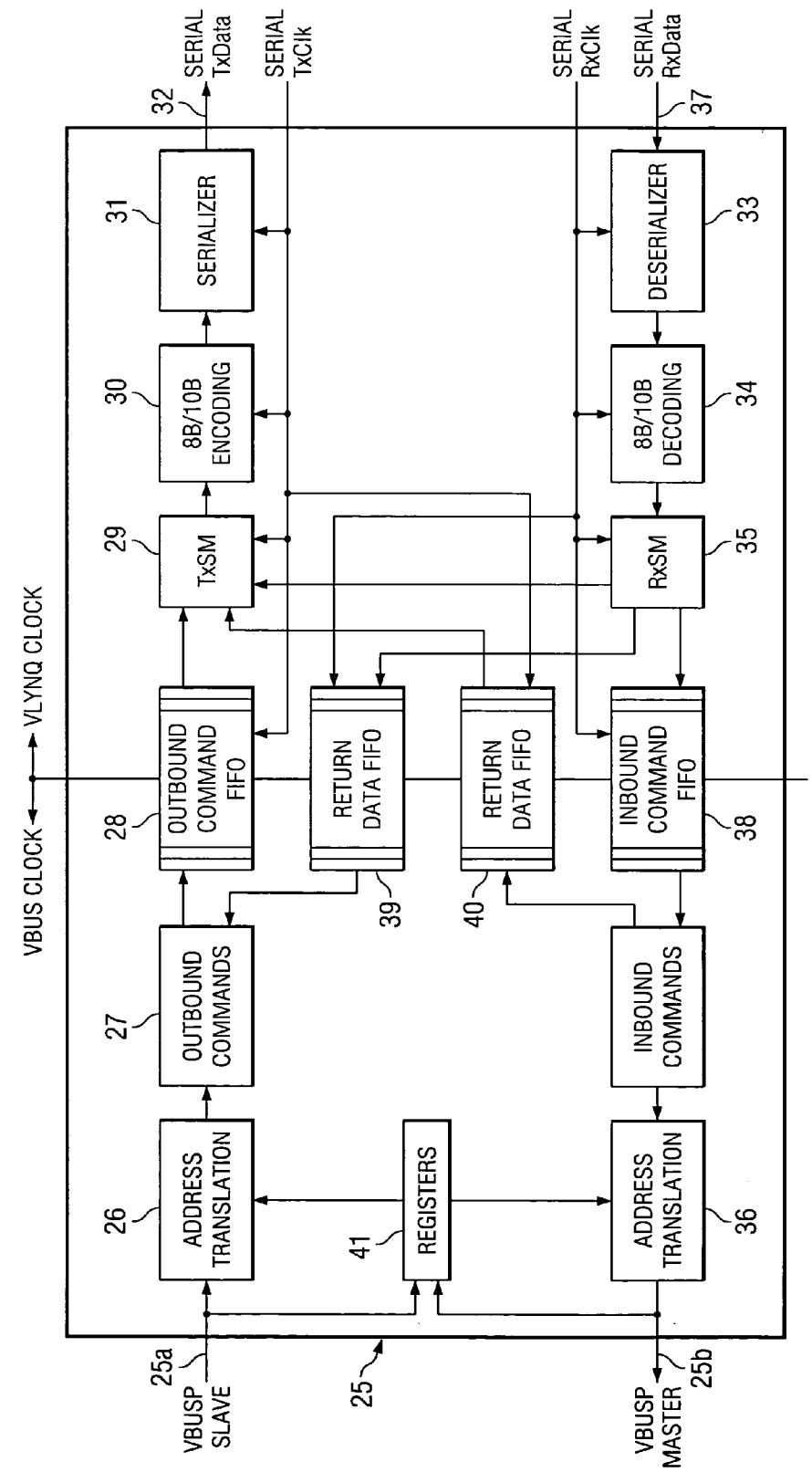
FIG. 2 is a block diagram of a VLYNQ module used in FIG. 1 in accordance with one embodiment of the present invention.

Referring to FIG. 1 there is illustrated a serial (i.e. low pin count) communications interface (VLYNQ) that enables the extension of an internal CBA bus segment to one or more external physical devices. VLYNQ accomplishes this function by serializing bus transactions in one device, transferring the serialized transaction between devices via a VLYNQ port, and de-serializing the transaction in the external devices. VLYNQ is a 3,5,7 or 9 pin serial interface for 1,2,3 or 4 bit parallel (serial but four bit wide) interface that allows one to connect peripherals, negotiate whatever it is and connect peripheral that previously could not be directly connected since it is sharing with everything else on an asynchronous slow moving bus. The devices have an internal bus (VBUS). VLYNQ is a 1,2,3, or 4 bit wide serial interface that connects the internal bus of one device to an internal VBUS of another device. The internal VLYNQ accomplishes this function by serializing bus transactions in one device, transferring the serialized transaction between devices via a VLYNQ port, and de-serializing the transaction in the external device.

As illustrated in FIG. 1 the host communication processor 11 includes an internal VBUS (a virtual bus) 11a and a VLYNQ interface module 13 connected by a serial cable 12 to a peripheral such as a Texas Instruments Inc. C55x Voice DSP 15 that also contains a VLYNQ interface module 17 connected to VBUS 15a of DSP 15. The VBUS or virtual bus is internal to a semiconductor chip or device and provides the communications between modules on the chip or device using the chip or device standard protocols. The transmit pins on the first device 13 connect to the receive pins on the second device 17. Request packets, response packets, and flow information are all multiplexed and sent across the same physical pins. The above described connection between processor 11 and DSP 15 is a VLYNQ host-to-peripheral connection. A peer-to-peer connection is also provided. This enables the extension of an internal common bus architecture bus segment to one or more external physical devices. In FIG. 1 the first peripheral device (C55x Voice DSP) 15 includes a second VLYNQ interface module 19 connected to the internal VBUS 15a that is coupled by serial cable 14 to VLYNQ interface 20 at a second voice DSP 21 for a peer to peer connection. The second voice DSP 21 can be daisy chained to other DSPs or other peripherals via VLYNQ interface 23 and another cable.

The block diagram of FIG. 2 illustrates a typical structure of a VLYNQ interface module 25. The VLYNQ module 25 implements two 32-bit, CBA 2.0 (VBUSP) interfaces. The slave interface 25a is required for transmit and control register access while one master interface 25b is required to receive. The transmit command flow includes an address translation 26 to outboard commands 27 and to outboard command First In First Out register (FIFO) 28, to providing transmit packets at transmitter 29, encoding in encoder 30 then serializing in serializer 31 to cable 12 at output port 32. The receiver flow from input port 37 includes the de-serializer 33, decoding 34, receiving packets at receiver 35, placing inbound commands in FIFO register 38 for commands. The return data for the slave port 25a from the port 37 is applied to the return data FIFO 39. The return data from the master port 25b is applied to the output port via the return data FIFO register 40. The inbound commands 37 are sent to the address translation 36. Serializer and de-serializer blocks 31 and 33 respectfully are required to convert to/from the 32-bit bus to their external serial interface. Because of the FIFO registers multiple outstanding CDA bus transactions are sent and received.

Data on the serial interface is encoded after the transmit with simple block code packet formatting of 8B/10B block coding 30 prior to the serializer 31. Special overhead code groups are used for frame delineation, initialization, and flow control.

The transfer protocol is a simple packet based protocol for memory mapped address with write request/data packet; read request packet; read response data packet and interrupt request data packet.

For maximum performance, First In First Out registers (FIFOs) 28 and 38 thru 40 are required to buffer entire bursts on the bus, minimizing bus latency. The FIFO's 28 and 38 thru 40 also align asynchronous serial data to the internal VBUSP clock.

Multiple VLYNQ modules 25 may be included on a single device such that VLYNQ devices are effectively daisy chained. Each VLYNQ module may be remotely configured for appropriate address translation and operation. Each VLYNQ module 25 includes a set of registers 41 described later.

Figure 3:
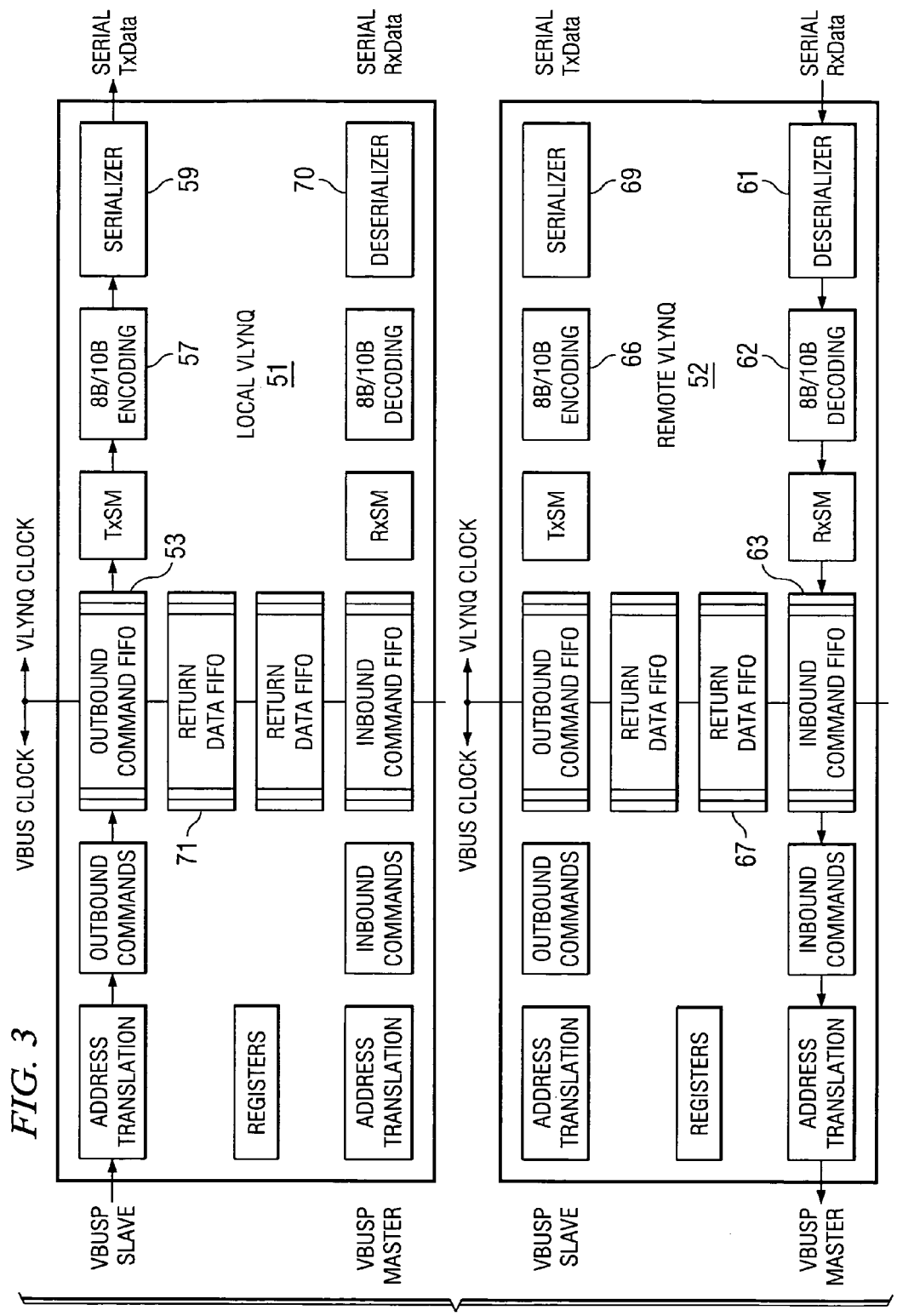
FIG. 3 illustrates the write operation between a local VLYNQ and remote VLYNQ.

FIG. 3 illustrates the write operation between a local VLYNQ module 51 and a remote VLYNQ module 52. The operation takes the following steps:

1. Write requests from the VBUSP are written into the Outbound Cmd FIFO 53 of module 51.
2. Data is subsequently read from the FIFO 53 and encapsulated in a Write Request packet. The format of the packet is shown in the VLYNQ_protocol.doc specification.
3. The address is translated, and the packet is encoded at encoding 57 and serialized at serializer 59 before being transmitted to the remote device.
4. The remote device 52 subsequently de-serializes at de-serializer 61 and decodes the receive data and writes it into the Inboard Command (Cmd) FIFO 63.
5. A VBUSP write operation is then initiated on the bus after reading the address and data from the FIFO 63.

Figure 4:
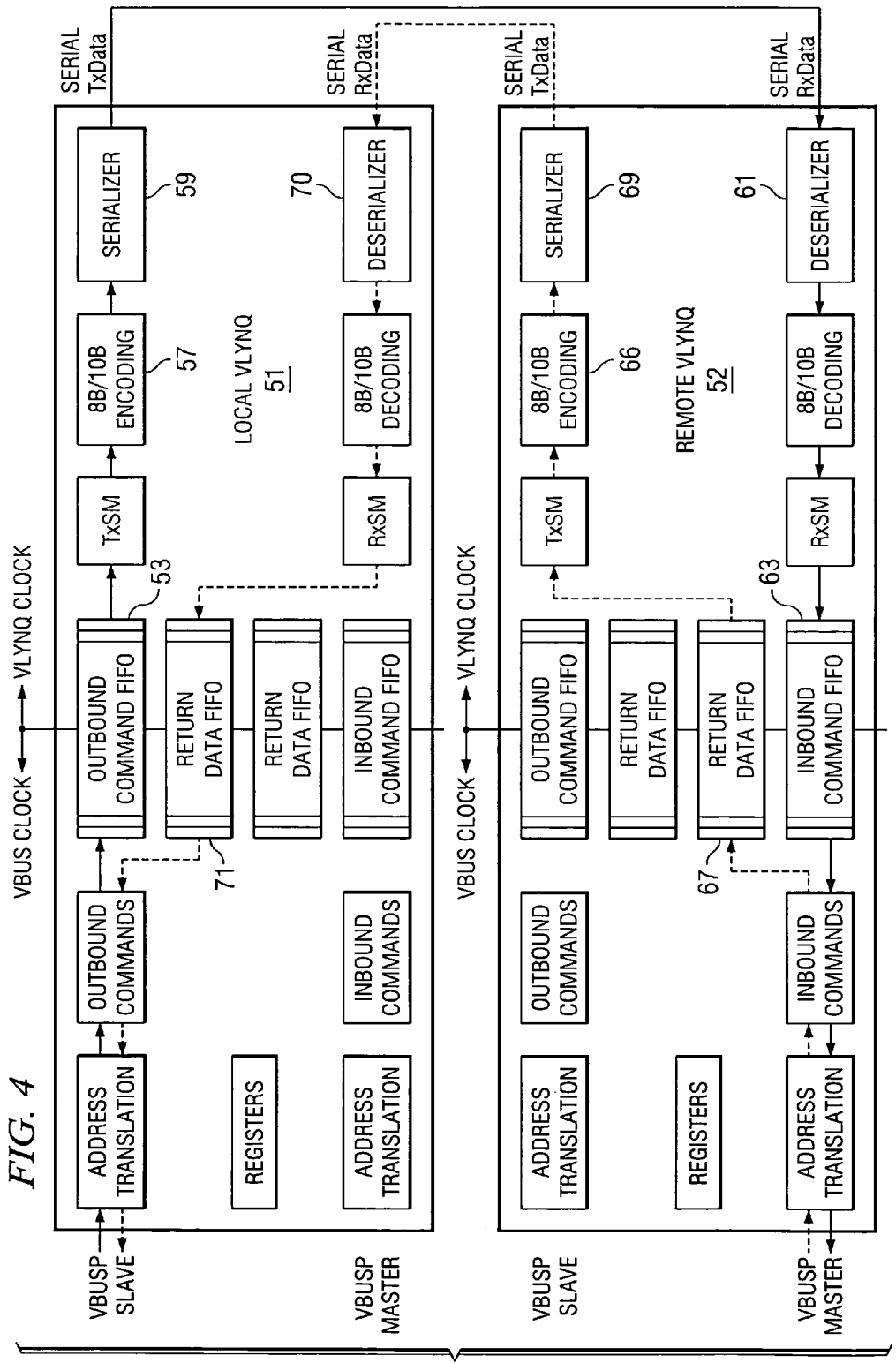
FIG. 4 illustrates the read operation between a local VLYNQ and remote VLYNQ.

Referring to FIG. 4 there is illustrated the read operation. The read operation takes the following steps.

1. Read requests from the VBUSP at the local VLYNQ 51 are written into the Outbound Cmd FIFO 53 similar to write requests.
2. Data is subsequently read from the FIFO 53 and encapsulated in a Read Request packet.
3. The packet is encoded at 57 and serialized at 59 before being transmitted to the remote device 52.
4. The remote device subsequently de-serializes and decodes the receive data and writes it into the Inboard Cmd FIFO 63.
5. A VBUSP read operation is then initiated on the bus after reading the address from the FIFO 63.
6. When the remote VBUSP receives the read data, the data is written to its Return Data FIFO 67 before being encoded at 66 and serialized at serializer 69.
7. When the receive data reaches the local VLYNQ module 51, it is de-serialized at 70, decoded, and written to the Return Data FIFO 71.
8. Finally, the ready signal is asserted, and the read data is transferred on the VBUSP.

Steps 6 to 8 are repeated for all data phases within the read burst. Read data is driven onto the VBUSP as each 32-bit word is received from the serial interface (read data is NOT held until the entire burst is stored in the Return Data FIFO). The data flow between two connected VLYNQs is shown with arrows in FIG. 4, with the read access originating from the Local VLYNQ device. The read data is returned by the Remote VLYNQ device and displayed with the dotted arrows.

Figure 5:
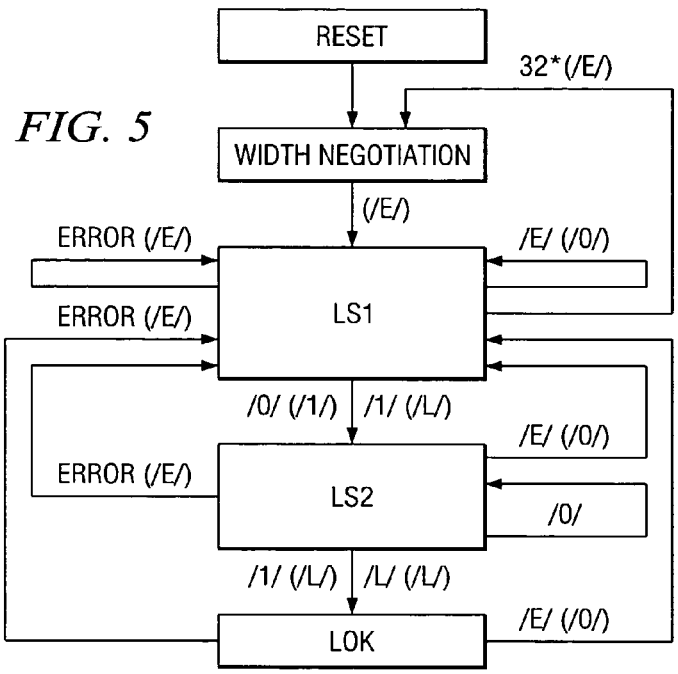
FIG. 5 illustrates the initialization process.

Since VLYNQ devices may be controlled solely over the serial interface (i.e. no local CPU exists), a reliable initialization sequence is necessary to establish a connection between two VLYNQ devices. The same sequence is used to recover from error conditions. The state machine of FIG. 5 represents the VLYNQ initialization sequence. LS1 refers to Link State 1, LS2 refers to Link State 2 and LOK refers to Link Established. The code definitions are described in the VLYNQ protocol section. The parenthesis indicates inbound code.

A link timer is used to generate a periodic Link code, /L/, every 2048 clocks. Transitions from the LOK state occur when this timer expires and no Link code has been detected during a period of 4096 clocks.

Auto Negociation

An auto negotiation occurs after reset and involves placing a negotiation protocol in the outbound data and processing the inbound data to establish connection information. The width of the data pins on the serial interface is automatically determined after the reset state, as part of the initialization sequence. For a connection between two VLYNQs of version 2.0 and later, the negotiation protocol using the available serial pins is used to convey the maximum width capability of each device. The transmitter (TX) and receiver (RX) data pins do not have the same width.

For connection to VLYNQ 1.X devices, the auto width negotiation will not occur until after the completion of the VLYNQ 1.X legacy width configuration, which involves a period of 2000 VLYNQ 1.X VBUSP clock cycles. After the VLYNZ 1.X has determined its width, it will receive the VLYNQ 2.0 auto width negotiation protocol. Since the VLYNQ 1.X device will not recognize this protocol, it will transmit Error codes (/E/) over the serial interface. VLYNQ 2.0 and later versions can determine from the received error codes how many serial pins are valid from the VLYNQ 1.X device.

Once the width is established, VLYNQ will use the Link states (LSO, LS1) to identify the version (2.0 or later, or version 1.X) of the remote VLYNQ. This will better determine the capabilities of the connected VLYNQ devices.

Address Translation

Figure 6:
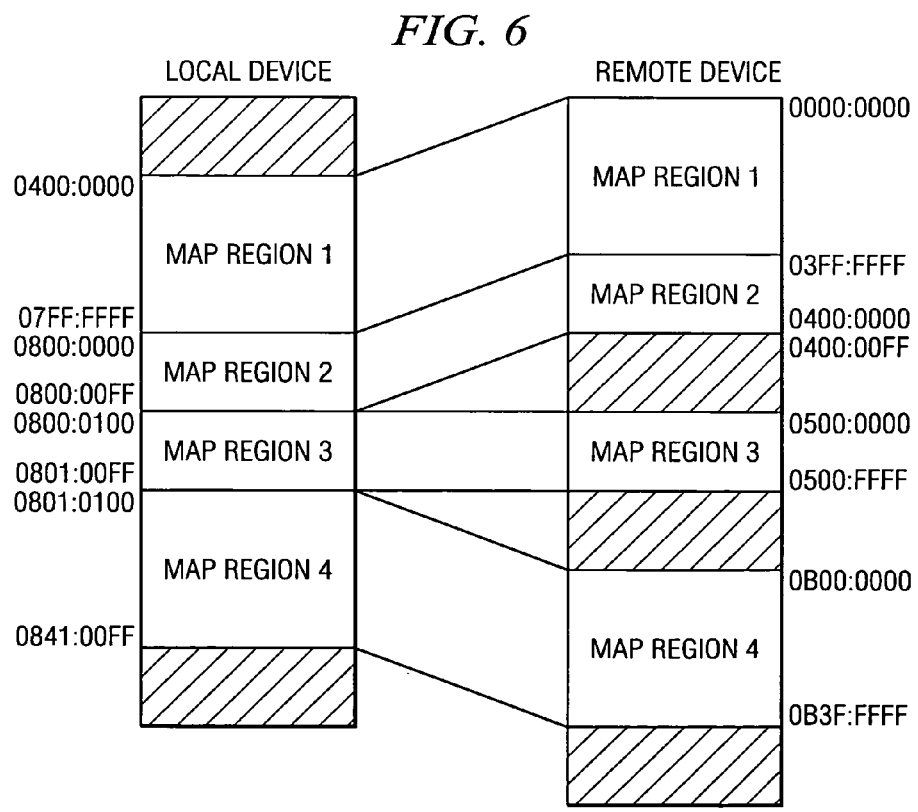
FIG. 6 illustrates an example of an address memory map.

In address translation (steps 26 and 36 in FIG. 20), VLYNQ allows each receive packet address to be translated into one of four mapped regions. No restriction is placed on the size or offset of each mapped region except that each must be aligned to 32-bit words. This is accomplished via register pairs that define the size and offset of each mapped region. FIG. 6 illustrates one possible memory map.

The following is an address translation example (single mapped region) illustrates the address translation used in each VLYNQ module.

| Register | Local VYLNQ Module | Remote VYLNQ Module |
| --- | --- | --- |
| Tx Address Map | 0x0400:0000 | Don't care |
| Rx Address Map Size 1 | Don't care | 0x0000:00FF |
| Rx Address Map Offset 1 | Don't care | 0x0000:0000 |

Local VLYNQ Module:

| | | |
| --- | --- | --- |
| | 0x0400:0054 | Initial address from VBUSP slave interface |
| subtract | 0x0400:00FF | Tx Address Map Register |
| | 0x0000:0054 | Translated address to remote device via serial interface |

Remote VLYNQ Module:

| | | |
| --- | --- | --- |
| | 0x0000:0054 | Initial address from Rx serial interface |
| compare | 0x0000:00FF | Rx Address Map Size 1 Register |
| | 0x0000:0054 | |
| add | 0x0000:0000 | Rx Address Map Offset 1 Register |
| | 0x0000:0054 | Translated address to remote device |

In this example, the local address 0x0400:0054 was translated to 1x000:0054 on the remote VLYNQ device.

The translated address for packets received on the serial interface is determined as follows:

```
If (Rx Packet Address < Rx Address Map Size 1 Register) {
    Translated Address = Rx Packet Address +
        Rx Address Map Offset 1 Register
} else if (Rx Packet Address < (Rx Address Map Size 1 Register +
        Rx Address Map Size 2 Register)) {
    Translated Address = Rx Packet Address +
        Rx Address Map Offset 2 Register −
        Rx Address Map Size 1 Register
} else if (Rx Packet Address < (Rx Address Map Size 1 Register +
        Rx Address Map Size 2 Register +
        Rx Address Map Size 3 Register)) {
    Translated Address = Rx Packet Address +
        Rx Address Map Offset 3 Register −
        Rx Address Map Size 1 Register −
        Rx Address Map Size 2 Register
} else if (Rx Packet Address < (Rx Address Map Size 1 Register +
        Rx Address Map Size 2 Register +
        Rx Address Map Size 3 Register +
        Rx Address Map Size 4 Register)) {
    Translated Address = Rx Packet Address +
        Rx Address Map Offset 4 Register −
        Rx Address Map Size 1 Register −
        Rx Address Map Size 2 Register −
        Rx Address Map Size 3 Register
} else {
    Translated Address = 0x0
```

Multiple VLYNQ modules may be included on any device such at VLYNQ serial interfaces are effectively daisy chained. The only requirement is that the address translation registers are configured to include the outbound VLYNQ module of the remote device.

Clocking

The VLYNQ module's serial clock direction and frequency are software configurable by writing clkdir and clkdiv fields of a control register. The VLYNQ serial clock may be sourced by the internal VLYNQ general reference clock, vlynq_clk_ref, (clkdir=1) or by an external clock (clkdir=0). When the internal reference clock is selected as the source, the clkdiv field determines the rate of the serial clock.

Interrupts

Each VLYNQ module is designed to provide maximum flexibility for generation, detection, and forwarding of interrupt information. Interrupts are generated when the Interrupt Pending/Set Register 81 is written. This register 81 may be written by the local VBUSP slave interface 25a or via the serial interface using Configuration packets.

Interrupts are generated by setting bits in the Interrupt Pending/Set Register 81. Bits in the Interrupt Pending/Set Register 81 can be set by either writing the Interrupt Pending/Set Register 81 (one of registers 41, see FIG. 20) directly via the VBUSP slave interface 25a or by asserting one of the vlynq_int_i pins. FIG. 7 is a conceptual illustration. Whenever the Interrupt Pending/Set Register is non-zero, the interrupt status is forwarded in one of two ways depending on the state of the intlocal bit in a Control Register 82 (one of registers 41, see FIG. 16). If intlocal=0, the contents of the Interrupt Pending/Set Register 81 are inserted in an Interrupt packet that is sent over the serial interface. When packet transmission has completed, the associated bits are cleared in the Interrupt Pending/Set Register 81. If intlocal=1, bits in the Interrupt Pending/Set Register are transferred to an Interrupt Status/Clear Register 83, and the OR of all of the bits in the Interrupt Status/Clear Register 83 is driven onto the vlynq_intlvl_o pin. If the vlynq_intlvl_o value was inactive, a pulse on the vlynq_intlvl_o pin is created. One of these pins are connected to the device's interrupt controller and will cause an interrupt. When software clears all bits in the Interrupt Status/Clear Register 83 (see FIG. 19) the vlynq_intlvl_o pin is de-asserted. When the system writes to the Interrupt Status/Clear Register 83 while interrupts are still pending, a new pulse is generated on the vlynq_intpls_o pin.

The Interrupt Vector registers 84 enable and map interrupts sourced from the interrupt pins in the Pending/Set register. When one of the vlynq_int_I pins is detected high and the corresponding inten bit in the Interrupt Vector Register 84 (see FIGS. 36 and 37) is set, the interrupt is written to the Interrupt Pending/Set Register 81. The actual bit that is set in the Interrupt Pending/Set Register 81 is determined by Interrupt Vector Registers 84. Once the Interrupt Pending/Set Register 81 is written, the interrupt generation occurs as described above.

If an external interrupt is configured as a pulse type source, for each pulse on the vlynq_int_I pin, the associated bit in the Interrupt Pending/Set Register is set. If an external interrupt is configured as a level, for each edge detected on the vlynq_int_I pin, the associated bit in the Interrupt Pending/Set Register is set. Until the level interrupt source is cleared, no more interrupts are set in the Interrupt Pending/Set Register. An End-of-Interrupt (EOI) function exists to re-enable the detection of active level interrupts. If the system attempts to write to the Interrupt Pending/Set Register, any level sensitive interrupts still active will be set in the Interrupt Pending/Set Register.

When an Interrupt packet is received on the serial interface, the interrupt status is extracted from the packet and written to the register indicated by the Interrupt Pointer Register 85 (see FIG. 21). This register may be anywhere in memory mapped space. For example, the Interrupt Pointer Register may contain the memory-mapped location of an interrupt status/set register in the device's interrupt controller. Alternatively, the Interrupt Pointer Register 85 may point to the memory-mapped location of its own Interrupt Pending/Set Register. Once the Interrupt Pending/Set Register is written, interrupt generation occurs as described above.

For additional flexibility of interrupt handling, a prioritized interrupt vector register is implemented to report the highest priority interrupt asserted in the Interrupt Pending/Set Register, when intlocal=1. VLYNQ will interpret bit 0 as the highest priority and bit 31 as the lowest. When read the value returned is the vector of the highest priority interrupt. Software can clear that interrupt by writing back the vector value.

Flow Control

The VLYNQ module automatically generates Flow Control Enable Requests, /P/, when the Rx FIFO resources are nearly consumed. The remote device will begin transmitting /1/s starting on the first byte boundary following reception of the request. When enough Rx FIFO resources have been made available, a Flow Control Disable Request, /C/, is transmitted to the remote device. In response, the remote device will resume transmission of data.

Power Management

Power management signals are implemented to enable the system to intelligently manage idle mode involving the local and remote VLYNQ devices. Two module output signals are available for the system to manage the serial clock operation. One of the signals, sbusy, indicates to the system when the serial clock is required. The other module signal, vbusy, indicates when the VBUSP clock is required. This signal can be used to control VBUSP clock power down function. The sbusy and vbusy, and other FIFO activity indicators, are all asynchronous signals.

Figure 8:
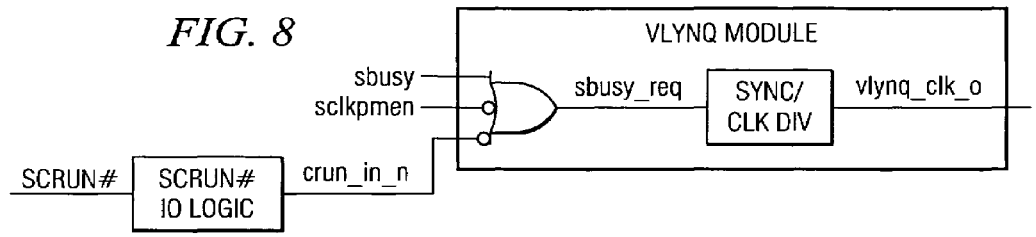
FIG. 8 illustrates the SCRUN# input.

VLYNQ can also fully control its power management through the use of an enternal device pin, referred to in this document as SCRUN#. This pin is an IO with an internal pull-up, and is connected to the other VLYNQ device's SCRUN# pin. VLYNQ can sutomatically control the serial clock generation based on the SCRUN# pin and on the enabled options. If software asserts the Power Management Enable (sclkpmen) option in the VLYNQ Control Register, then the VLYNQ device that is driving vlynq_clk_o out can place the clock in idle mode. To enter idle mode, there must be no VLYNQ activity as indicated by the local sbusy signal. Also, SCRUN# must be driven high, which indicates that there is no activity in the external VLYNQ. FIG. 8 shows how the SCRUN# drives crun_in_n, which is gated with the sbusy and sclkpmen signals to dirive the sbusy_req signal into the Sync/CLK Div module to control idle mode of vlynq_clk_o. If sbusy_req is driven low, then vlynq_clk_o can go into Idle Mode.

Figure 9:
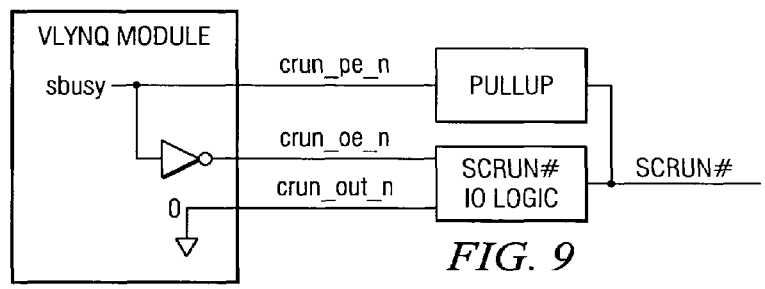
FIG. 9 illustrates the SCRUN# Generation.

FIG. 9 displays how SCRUN# is generated. The crun_pe_n enables the internal SCRUN# pull-up, while the crun_out_n will drive the SCRUN# low if it is enabled by crun_oe_n. The pull-ups are disabled when VLYNQ is active to further reduce power. They will also only burn power on the start or end of a transaction.

Figure 10:
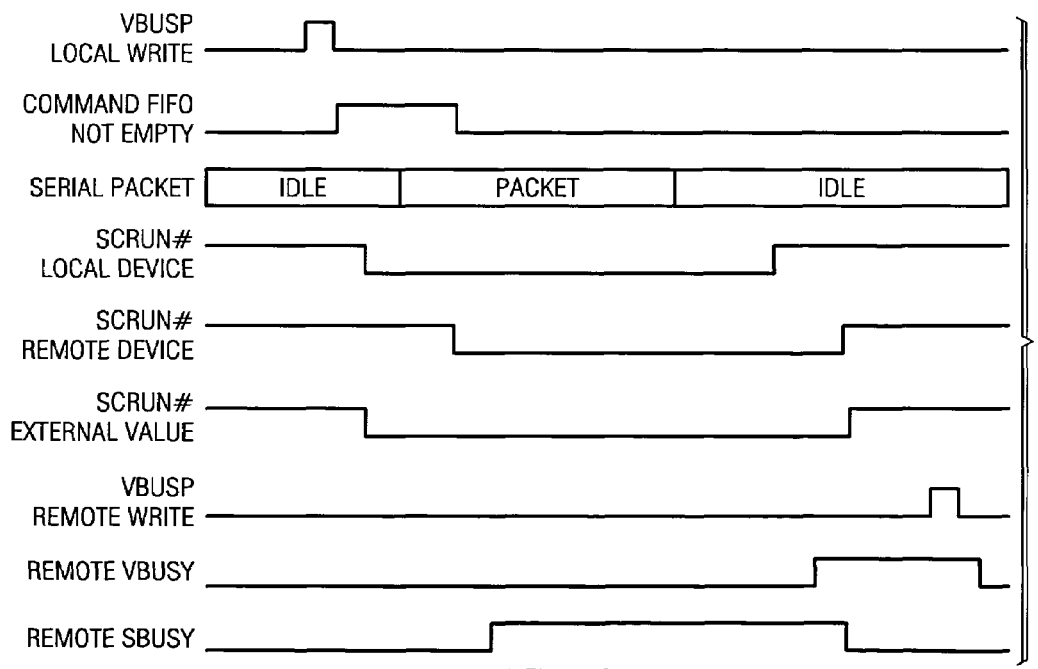
FIG. 10 is SCRUN# timing diagram.

As shown in FIG. 10, the sbusy signal indicates that the VLYNQ clock is required. Internally the VLYNQ serial clock is stopped or started. Since the VBUSp clock is not required for serial operation to commence, the VBUSp clock only need be operational while either a slave or interrupt is given to the VLYNQ module or the vbusy is high. In VLYNQ version 2.0 and later, both the VLYNQ and VBUSp clocks are independently controlled for power management.

PHY

This PHY section contains information on PHY (physical) operation within the VLYNQ module. This includes negotiation between two VLYNQs to establish width capabilities, 8b/10b encoding/decoding, and serializing/deserializing of data.

Figures 11, 12, 15:
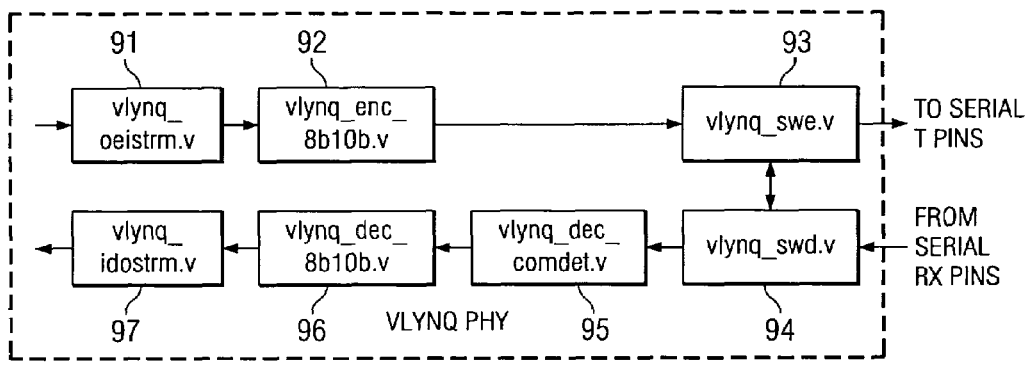
FIG. 11 illustrates VLYNQ physical modules.
FIG. 12 illustrates the initial width negotiation protocol code (Bit 1).
FIG. 15 illustrates the revision register.

These VLYNQ PHY Modules, illustrated by FIG. 11, describes the PHY sub-section of VLYNQ. All the modules here are in the serial clock domain.

For transmit PHY the vlynq_oeistrm.v module 91 reads data out 32 bit data from the command and data FIFO (28 and 40 in FIG. 2). It creates the special 8b/10b code groups, such as IDLE and SOP, and sends it out along with the data in an 8 bit bus to the 8b10b encoder (30 in FIG. 2). The state machines handle versions 1.X and 2.0 protocols according to the version information input bit. This module also performs the byte swapping.

The vlynq_enc_8b10b.v module 92 reads out 8 bit data from vlynq_oeistrm.v 91 and performs 8b/10b encoding. It sends out the 8b/10b 10 bit data code to vlynq_swe.v module 93.

The vlynq_swe.v module 93 (31 in FIG. 2) serializes the outgoing serial data. It is responsible for taking data from the encoder blocks and bit shifting the data at the negotiated pin width for transmission into the serial pins. The vlynq_swe.v 93 also has logic for Auto Negotiation. After reset, it works with the vlynq_swd.v module 94 to negotiate pin width as described below. The vlynq_swe.v module 94 determines if the remote VLYNQ is Version 1.X. This version information, as well as the width size signals, is an output of vlynq_swd.v 94.

For receive PHY the vlynq_swd.v module 94 (33 in FIG. 2) de-serializes the incoming serial data. It is responsible for bit shifting the serial data at the negotiated pin width and sending it to the decoder module 96 (34 in FIG. 2) through a 10 bit data bus. The vlynq_swd.v 94 also has logic for Auto Negotiation. After reset, it works with the vlynq_swe.v module 94 to negotiate pin width as described below.

The vlynq_dec_comdet.v module 95 takes the 10 bit data from vlynq_swd.v 94 and shifts the data until a comma is found in the form of the 8b10b Error Code /K28.1/. Once aligned, the data is output to the 8b/10b decoder 96 through a 10 bit bus.

The vlynq_idostrm 97 receives the 8 bit data from vlynq_dec_8b10b.v 96 and processes the 8b/10b code to extract the data to be stored in the command 9 38 in FIG. 2) and data FIFO (39 in FIG. 2) over a 32-bit bus. The state machine to determine if link is established is included in this module 97. This module also performs the byte swapping.

Width Auto Negociation

The following describes the design implementation of the Width Auto Negotiation between two VLYNQ devices as summarized previously.

With VLYNQ 1.X devices, the width of the data pins were determined by pull-ups and/or pull-downs attached to the transmit pins (bits 2:0). The value from these pins indicates the pin width plus 1, and are latched in 2000 VBUSP clocks after reset.

With VLYNQ 2.0 devices, a special protocol is used to automatically negotiate the width after reset. This protocol is not in 8b/10b format. With VLYNQ 2.0 to 2.0 connections, the 2000 VBUSP clock cycle wait is no longer necessary, thus a faster start-up time. In a setup with a VLYNQ 2.0 to 1.X connection, the 2.0 device can also automatically determine the width of a Version 1.X device.

VLYNQ 2.0 To 2.0 Connection

After reset, VLYNQ 2.0 devices will send out a width negotiation protocol to determine the width of the RX and TX data pins (Note: RX and TX may have different widths). When two VLYNQ 2.0 devices are attached, they will process each other's negotiation protocol. These are two different parts involved in negotiating the width. The first part involves determining the maximum inbound data pin width (in width). The second part involves sending out this pin width information to the remote VLYNQ.

The initial part of the 2.0 Width Negotiation Protocol uses the data bit code 0010b, and is transmitted over ten time slots (each time slot is a serial clock cycle). This code will be received by the remote VLYNQ's receive logic and used to determine the live pins. Starting with the bit 0 position, the code is placed on all the TX data pins, but on different time slots. This first bit of the code is placed on data pin 0 at time slot 0, on data pin 1 at time slot 7, on data pin 2 at time slot 5, and on data pin 3 at time slot 2. The time slots have been chosen for the purpose of forcing VLYNQ 1.X devices to return expected data. Since the first bit of the code is 0, all the data pins will be expected to be 0 over all ten time slots.

The second bit position of the code has a value of 1, and is the part of the code that conveys to the remote device which pins are active. FIG. 12 shows the value on the data pins when the bit value of the code is one and all data pins are available, indicating a data pin width of 4. The VLYNQ receiver uses the bit value of 1 in the data bit code (0010b), at the proper time slot, to determine if the pin can be used. The values on the data pin on the other time slots are expected to be 0 to complete a match for a pin width of 4.

For a data pin width of 3, the receiver would not get a value of 1 at time slot 2 on data pin 3, so the receiver would conclude that data pin 3 is not available and the width could be at most 3 pins.

VLYNQ will continue to send out the code until two consecutive codes are received with proper code values.

Once two proper consecutive codes are received, the VLYNQ transmitter will send out the second part of the negotiation protocol. The first two bits of this protocol are the same as the initial protocol, with a starting value of 0, followed by value of 1. It is then followed by the 4-bit in-width value determined from the first part of the protocol. The pattern that this code is sent out is the same as the first part of the protocol, using the same time slots of 0,7,5 and 2.

VLYNQ 2.0 to 1X Connection

VLYNQ will wait until two consecutive codes are received before completing the width negotiation protocol. Once this is complete, VLYNQ will attempt to link using the 8b/10 format.

Since a VLYNQ 2.0 device does not have version information on the remote device after reset, it will send out the width negotiation protocol mentioned above as if the remote device was Version 2.0. For the case that the remote device is Version 1.X, it performs in parallel a width detection mechanism (Parallel Width Negotiation) to determine the width of a Version 1.X device.

After reset, the VLYNQ 1.X device will be waiting 2000 of its VBUSP clock cycles, and then it will latch in its width value. At this point the 1.X device will attempt to link, but it will receive the Version 2.0 specific width negotiation protocol from the 2.0 device. The bit pattern for the VLYNQ 2.0 width negotiation protocol were chosen to ensure that there would be sufficient consecutive zeroes to force VLYNQ 1.X devices to reply with the 8b/10b Error code.

While Version 2.0 is comparing the received serial data for a possible match with the VLYNQ 2.0 width Negotiation Protocol, it is also comparing the data to two 8b/10b Codes. As mentioned earlier, the VLYNQ 1.X device will be sending the 8b/10b error code in response to the 2.0 Negotiation Protocol. The bit value of the error code (including the inverse value) is 0011111100111000000110b. Due to the timing of data placed into the FIFO, the 1.X device can potentially send the Idle code as well as the Error code. The bit value of the error code (including the inverse value) is 00111110101100000101b. The Error and Idle code differ only in the last two bits of each ten-bit set. Therefore, the bit pattern that the 2.0 device will compare with the serial data is 00111110XX11000001XXb. The consecutive X bits must be opposite values. The comparison will be performed simultaneously on all possible data pin widths. FIG. 13 shows the data table of the Error/Idle code received on the 1 pin, 2 pin, 3 pin and 4 pin connections.

The X1 and X2 values in the above table must be the inverse value of the other. If any data pattern from the table is received by the 2.0 device, then the receive data pin width (inwidth) is set accordingly. Since VLYNQ 1.X supports only symmetric data pin widths, the 2.0 device will set the transmit data pin width (outwidth) to the same value as the receive width.

Registers

FIG. 14 is a register map.

FIG. 15 illustrates the revision register. The revision register contains the major and minor revisions for the VLYNQ module.

FIG. 16 illustrates the control register. The control register determines operation of the VLYBQ module.

FIG. 17 illustrates the status register. The status register is used to detect conditions that may be of interest to the system designer.

FIG. 18 illustrates Interrupt Priority Vector Status/Clear register. When read, the Interrupt Priority Vector Status/ Clear register displays the highest priority vector with a pending interrupt. When writing, only bits [4:0] are valid, and the value represents the vector of the interrupt to be cleared.

The Interrupt Status/Clear register indicates the unmasked interrupt status. Writing 1 to any bit in this register will clear the corresponding interrupt. Any write to this register will EOI level sensitive interrupts attached directly to the VLYNQ module. FIG. 19 illustrates the Interrupt Status/ Clear register.

The Interrupt Pending/Set Register indicates the pending interrupt status when the intlocal bit in the control register is not set. When the interrupt packet is forwarded on the serial interface, these bits are cleared. FIG. 20 illustrates the Interrupt Pending/Set register.

The interrupt Pointer Register should be written with address of the interrupt set register for the device. This register should contain the address of either the interrupt set register in the interrupt controller module of the device or the Interrupt Pending/Set register within the VLYNQ module. FIG. 21 illustrates the Interrupt Pointer Register.

The Tx Address Map Register is used to translate transmit packet addresses to remote device VBUSP addresses. FIG. 22 illustrates the Tx Address Map Register.

The Rx Address Map Size 1 Register is used to identify the intended destination of inbound serial packets. FIG. 23 illustrates Rx Address Map Size 1 Register. The Rx Address Map Offset 1 Register is used with the Rx Address Map Size 1 Register to translate receive packet addresses to local device VBUSP addresses. FIG. 24 illustrates the Rx Address Map Offset 1 Register.

The Rx Address Map Size 2 Register is used to identify the intended destination of inbound serial packets. FIG. 25 illustrates the Rx Address Map Size 2 Register.

The Rx Address Map Offset 2 Register is used with the Rx Address Map Size 2 Register to translate receive packet addresses to local device VBUSP addresses. FIG. 26 illustrates the Rx Address Map Offset 2 Register.

The Rx Address Map Size 3 Register is used to identify the intended destination of inbound serial packets. FIG. 27 illustrates the Rx Address Map Size 3 Register.

The Rx Address Map Offset 3 Register is used with the Rx Address Map Size 3 Register to translate receive packet addresses to local device VBUSP addresses. FIG. 28 illustrates the Rx Address Map Offset 3 Register.

The Rx Address Map Size 4 Register is used to identify the intended destination of inbound serial packets. FIG. 29 illustrates the Rx Address Map Size 4 Register.

The Rx Address Map Offset 4 Register is used with the Rx Address Map Size 4 Register to translate receive packet addresses to local device VBUSP addresses. FIG. 30 illustrates the Rx Address Map Offset 4 Register.

The Chip Version Register reflects the value on the device_id and device_rev pins. This register provides a mechanism for software to determine the type and version of VLYNQ devices. The value of device_id and device_rev field must be specified in the device specification. The device must be registered with the VLYNQ IP group to be assigned a unique ID to distinguish it form other VLYNQ devices. FIG. 31 illustrates the Chip Version Register.

The Auto Negotiation Register reflects the ability of the VLYNQ to communicate with the remote VLYNQ on their respective abilities after reset. FIG. 32 illustrates the Auto Negotiation.

The Manual Negotiation Register is used by software when Bit 31 of the Auto Negotiation Register indicates that VLYNQ is not able to communicate with the remote VLYNQ on their respective abilities after reset. This is a device-specific register and is an optional implementation. FIG. 33 illustrates the Manual Negotiation.

The Negotiation Status Register reflects the current abilities communicated between the local and remote VLYNQ. FIG. 34 illustrates the Negotiation Status.

The Endian Register determines the byte order that the VBUSP data bus is written to or read from. The default is Little Endian. The byte order for local register access is not affected. FIG. 35 illustrates the Endian.

The Interrupt Vector 3-D Register enabled and maps interrupts sourced from the vlynq_int_I[3:0] pins. FIG. 36 illustrates the Interrupt Vector 3-0 Register.

The Interrupt Vector 7-4 Register enabled and maps interrupts sourced from the vlynq_int_I[7:4] pins. FIG. 37 illustrates the Interrupt Vector 7-4 Register.

The Remote Configuration Registers are the same registers described above but for the remote VLYNQ device. Configuration accesses are used to access these registers and do not require configuration of the address translation registers.

Serial Clock Connection

Figure 38:
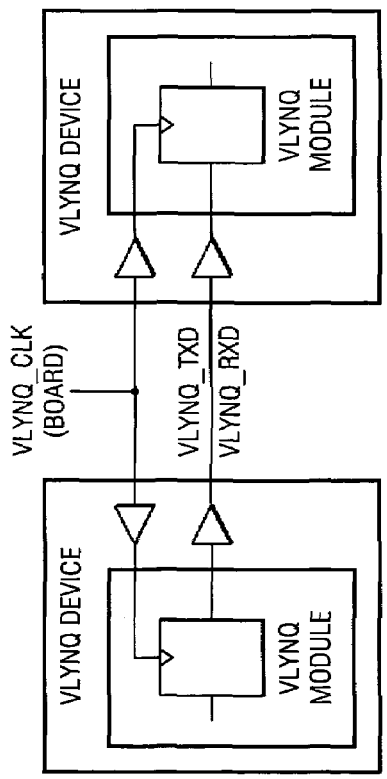
FIGS. 38 and 39 illustrate the proper connection of VLYNQ devices.
Figure 39:
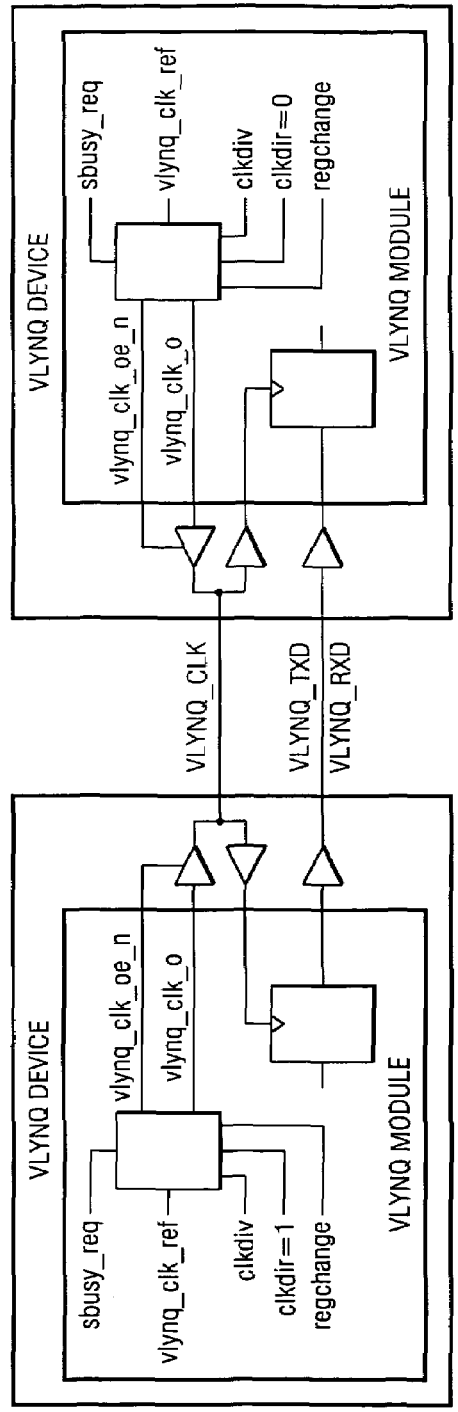

VYLNQ devices are connected such that adequate setup is easily achieved. FIGS. 38 and 39 illustrate the proper connection of VLYNQ devices. In FIG. 39 the VLYNQ module with clkhir=1 is driving VLYNQ_CLK out.

An extra serial transmit clock input (vylnq-tclk_early_I) is added for VLN to assist in meeting timing. This is done by driving the final four vlynq_txd_o flops with the vlynq_tclk_early_I, instead of the heavy loaded CTS, which has a longer delay. The vlynq$_{txd}$_0[74] flops are tied to zero. To avoid potential hold problems, data for loopback (vlynqlp-data) is generated from different flops, which are clocked by the CTS.

Figure 40:
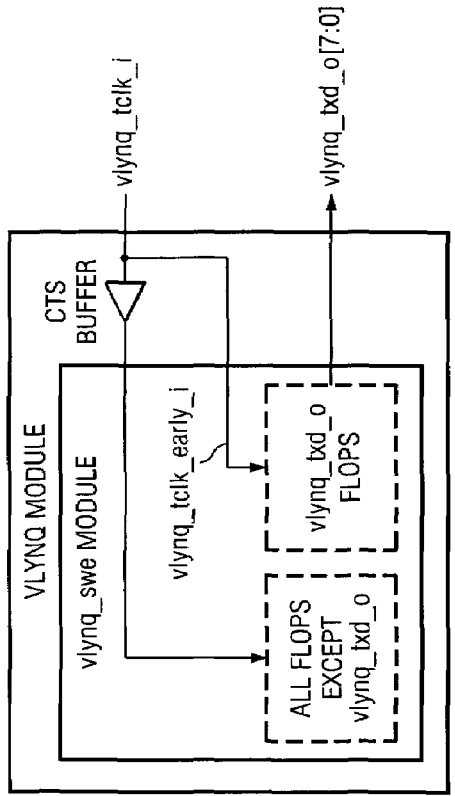
FIG. 40 illustrates the early serial transmit clock.

FIG. 40 illustrates the early serial transmit clock. For VLYNQ version 2.0, an extra input clock, called vlynq_clk_ref, is added for more flexibility in serial clodk generation. This is the input clock to the serial clock generator. It can be connected to the VBUSP clock, o it can be completely asynchronous to the VBUSP clock and at a higher rate if needed. The serial clock does not have to be less than twice the VBUSP clock frequency as in VLYNQ version 1.

The vlynq_clk_ref generates the vlynq_clk_o signal and deals with all SCRUN (power management) issues. Since the VLY NQ modules deals with stoping the serial clock, then the only elements needed is the sorce clock and CTS.

TIMING REQUIREMENTS

| No. | Parameter | Min | Max | Unit |
|-----|-----------|-----|-----|------|
| 1 | Clock period (Tperiod), VLYNQ_CLK | 0 | tbd | ns |
| 2 | Pulse duration, VLYNQ_CLK high | tbd | | ns |
| 3 | Pulse duration, VylNQ_CLK low | tbd | | ns |
| 4 | Delay time, VLYNQ_CLK↑ to VLYNQ_TXD invalid | 2.25 | | ns |
| 5 | Delay time, VLYNQ_CLK↑ to VLYLQ_valid | | Tperiod-0.25 | ns |
| 6 | Setup time, VLYNQ_RXD before VLYNQ_CLK↑ | −0.75 | | ns |
| 7 | Hold time, VLYNQ_RXD after VLYNQ_CLK↑ | | | |

The timing diagram is illustrated in FIG. 41. The table above assumes that the difference in the board delay for the VLYNQ_CLK and any VLNYQ_TXD pin is less than 0.25 ns (used for receive hold time margin). It also assumes that the total board delay for the VLNYQ_CLK plus any VLYNQ_TXD signal is less than 1.00 ns (used for maximum VLNYQ_CLK to VLYNQ_TXD valid delay time). Maximum pin loading is assumed to be 15 pF (used for maximum VLYNQ_CLK to VLYNQ_TXD valid delay time). Minimum capacitance is assumed to be 7 pF (used for minimum VYLNQ_CLK to VLNQ_TXD delay time).

VLYNQ Protocol

VLYNQ relies on 8B/10B block coding to minimize the number of serial pins and allow for in-band packet delineation and control. Included in the following sections are the general 8B/10B coding definitions and their implementation within the different VLYNQ versions.

| Code Group Name | Octet Value | Octet Bits | Current RD− | Current RD+ |
|-----------------|-------------|------------|-------------|-------------|
| K28.0 | 1C | 000 11100 | 001111 0100 | 110000 1011 |
| K28.1 | 3C | 001 11100 | 001111 1001 | 110000 0110 |
| K28.2 | 5C | 010 11100 | 001111 0101 | 110000 1010 |
| K28.3 | 7C | 011 11100 | 001111 0011 | 110000 1100 |
| K28.4 | 9C | 100 11100 | 001111 0010 | 110000 1101 |
| K28.5 | BC | 101 11100 | 001111 1010 | 110000 0101 |
| K28.6 | DC | 110 11100 | 001111 0110 | 110000 1001 |
| K28.7 | FC | 111 11100 | 001111 1000 | 110000 0111 |
| K23.7 | F7 | 111 10111 | 111010 1000 | 000101 0111 |
| K27.7 | FB | 111 11011 | 110110 1000 | 001001 0111 |
| K29.7 | FD | 111 11101 | 101110 1000 | 010001 0111 |
| K30.7 | FE | 111 11110 | 011110 1000 | 100001 0111 |

Each VLYNQ module must support a limited number of ordered sets. Ordered sets provide the delineation of packets and synchronization between VLYNQ modules at opposite ends of the serial connection. VLYNQ 2.0 and later versions do not require some of the following ordered sets.

| Code | Ordered Set | Encoding | Octet Value |
|------|-------------|----------|-------------|
| /I/ | Idle | /K28.5/ | BC |
| /S/ | Start of Packet | /K27.7/ | FB |
| /T/ | End of Packet | /K29.7/ | FD |
| /M/ | Byte Disable | /K23.7/ | F7 |
| /P/ | Flow Control Enable | /28.0/ | 1C |
| /C/ | Flow Control Disable | /K28.2/ | 5C |
| /F/ | Flowed | /K28.3/ | 7C |
| /E/ | Error Indication | /K28.1/ | 3C |
| /0/ | Init0 | /K28.4/ | 9C |
| /1/ | Init1 | /K28.6/ | DC |
| /L/ | Link | /30.7/ | FE |

The IDLE (/I/) ordered sets are transmitted continuously and repetitively whenever the serial interface is idle. For VLYNQ version 2.0, idle is also used tin place of the Flowed code.

A Start of Packet delimiter (/S/) is used to delineate the starting boundary of a packet. This is only used with VLYNQ version 1.

An End of Packet (/T/) delimiter is used to delineate the ending boundary of a packet.

The Byte Disable (/M/) symbol is used to mask bytes for write operations.

A Flow Control Enable (/P/) request is transmitted when VLYNQ module's receive FIFO is full or nearly full. This code causes the remote VLYNQ device to cease transmission of data.

The Flow Control Disable (/C/) request is transmitted by a VLYNQ module when receive FIFO resources are available to accommodate additional data.

The Flowed (/F/) code is transmitted by a VLYNQ module following the reception of a Flow Control Enable request. This code will be continually transmitted until a Flow Control Disable is received. This is not used in VLYNQ 2.0 and later versions.

The Error Indication (/E/) is transmitted when error are detected within a packet. Examples of such errors include illegal packet types and code groups.

The Init) (/0/) code group is used during the Link initialization sequence. The VLYNQ 2.0 version uses this code with an extra byte for identifying earlier VLYNQ. Version 1 devices.

The Init1 (/1/) code group is used during the Link initialization sequence. VLYNQ2 and later uses this code with an extra byte for identifying Version 1 devices The Link (/L/) code group is used during the Link initialization sequence. A link code group is also transmitted each time the internal link timer expires.

The packet headers include packet type, byte count and address information.

The VLYNQ packet format is shown in FIG. 42 for VLYNQ 1.X where 0,N,65. Multi-byte fields are transferred least significant byte first.

The VLYNQ packet format is shown in FIG. 43. VLYNQ 2.0 packets are similar to version 1 with a few changes to improve performance and support dual channel operations during flowed states. VLYNQ protocol also remains very extendable for potential uses in transporting protocol packets as well as adding a few other VBUSP commands. As long as at least one command kept reserved, extending the command space is supported.

The VLYNQ 2.0 packet format is shown in FIG. 43 where 0<N<65. Multi-byte fields are transferred least significant byte first.

Table

The cmd2 field is only included in the packet if the packet type indicates extended command (pkttype=0110). This provides a mechanism to add new features at some later time.

Configuration packet types are used to access VLYNQ module registers remotely and so do not depend on Control Register bit settings. VLYNQ version 1 accepts VBUS Read Response command of cmd [7:0]=111x000h. For version 2.0, the transmitter (Tx) command is moved to cmd[7:0]= 1110000h, so that all VBUSP modules are supported with cmd[4] bit set. This makes it easier for decode of other protocols.

The current command space usage is:
48—writes
48—Reads
01—Interrupt
01—Read Response.

This is 98 of the 256 possible choices. The available command space is 30 for VBUSP extensions and 128 for packet protocols.

VLYNQ 2.0 Packets
1. The SartOfPacket has been dropped.
2. The Read returns packet has been changed to have 4 bit set, in 1.0.X mode it was sent as a 0, but could be received as a 1 or 0.
3. Flow Enable, Disable, and the return from Flowed all have a following byte that indicates the channel effected.
4. Flowed has been replaced with idle as the Flowed does not provide any extra information.
5. Init0 and Init1 carry an extra byte of data for link abilities and identifying 1.X from 2.X and forward.

Basic Packets:
Read32-caaaaT
Write32-caaaadddT
ReadCfg-claaaaT
WriteCfg-claaaaddddddddT
ReadBurst-claaaaT
WriteBurst-claaaaddddddddddddT
Int-cddddT
ReadReturn-clddddddddT In accordance with the present invention a host of peripherals is provided with the VLYNQ modules to be linked to the host. Integrated into the CPE platform may be:
DSL(PHY/Mac) 100thernet, USB 1,1, external memory
Cable (DOCSIS 1.1) 10/100 Ethernet, USB 1.1, external memory
Wireless (802.11) 10/100 Ethernet, PCI,USB,PCMCIA
IP Phone 10/100 Ethernet, USB master/slave, external memory, LCD control, Key pad
Gateway 10/100 Ethernet, USB master/slave, external memory, LCD control, Key pad

The invention claimed is:

1. A communications system for enabling extension of an internal common bus architecture (CBA) bus segment of a first physical semiconductor chip device to an internal CBA bus segment of a second external physical semiconductor chip device comprising:
a first serial communications interface module in said first semiconductor chip device of varying bit width at transmit and receive pins coupled to said internal bus segment of said first semiconductor chip device for serializing bus transaction from said first device to an output port of said first device;
a second serial communications interface module in said second semiconductor chip external device of varying bit width at transmit and receive pins coupled to said internal bus segment for said second semiconductor chip device for de-serializing data received at an input port for said second device for providing an extension of said internal CBA bus segment in said second device to external physical devices at an input port and
an external serial connector for transferring the serialized transaction between first and second devices at said input and output ports using semiconductor chip protocols; said modules carrying CBA bus commands, interrupt and confimiration operations in band over the same transmit and receive pins.

2. The system of claim 1 wherein multiple outstanding CBA bus transactions are sent and received.

3. The system of claim 1 wherein said second serial communications interface module in said second external device is daisy chain coupled between said internal bus segment of said second device and other peripheral devices through external serial cablings.

4. A communications system for enabling extension of an internal common bus architecture (CBA) segment of a first physical device to an internal CBA bus segment of a second external physical device comprising:
a first serial communications interface module of varying bit width at transmit and receive pins in said first device coupled between said internal bus segment of said first device and an input and output port of said first device for serializing bus transactions from said first device and said output port of said first device and de-serializing data received at said input port of said first device;
a second serial communications interface module of varying bit width at transmit and receive pins in said second external device coupled between said internal bus segment of said second device and an input and output port of said second device for serializing bus transactions from said second device and said output port of said second device and de-serializing data received at said input port of said second device; and
an external serial connector coupled to said input and output ports of said first and second devices for transferring the serialized transaction between first and second devices; said modules carrying CBA bus commands, interrupt and configuration operations in band over the same connections and said modules providing serial width negotiation between said modules.

5. The system of claim 4 wherein said second serial communications interface module in said second external device is daisy chain coupled between said internal bus segment of said second device and other peripheral devices through external serial cablings.

6. The system of claim 4 wherein said first and second modules each provide address translation between devices.

7. The system of claim 4 wherein a width detection mechanism is used.

8. The system of claim 4 wherein said modules will send out width negotiation protocol to determine the width at the transmit and receive pins.

9. The system of claim 4 wherein said first and second modules each provide a set of registers.

10. The system of claim 6 wherein said first and second modules include encoding and decoding.

11. A communications system for enabling extension of an internal common bus architecture (CBA) segment of a first physical device to an internal CBA bus segment of a second external physical device comprising:

a first serial communications interface module in said first device coupled between said internal bus segment of said first device and an input and output port of said first device for serializing bus transactions from said first device and said output port of said first device and de-serializing data received at said input port of said first device;

a second serial communications interface module in said second external device coupled between said internal bus segment of said second device and an input and output port of said second device for serializing bus transactions from said second device and said output port of said second device and de-serializing data received at said input port of said second device; and an external serial cable coupled to said input and output ports of said first and second devices for transferring the serialized transaction between first and second devices; said first and second modules each provide outbound and inbound command First In First Out (FIFO) registers and return data FIFO registers.

12. A communications system for enabling extension of an internal common bus architecture (CBA) segment of a first physical device to an internal CBA bus segment of a second external physical device comprising:

a first serial communications interface module in said first device coupled between said internal bus segment of said first device and an input and output port of said first device for serializing bus transactions from said first device and said output port of said first device and de-serializing data received at said input port of said first device;

a second serial communications interface module in said second external device coupled between said internal bus segment of said second device and an input and output port of said second device for serializing bus transactions from said second device and said output port of said second device and de-serializing data received at said input port of said second device; and an external serial cable coupled to said input and output ports of said first and second devices for transferring the serialized transaction between first and second devices; said first and second modules each provide a set of resisters; said set of registers includes a control register for controlling the module, transmit address map register and receive address map registers for address translation.

13. The system of claim 12 wherein said set of registers includes an interrupt pending/set register, an interrupt status/clear register, a priority vector status/clear register and interrupt pointer register.

* * * * *